US010627218B2

(12) United States Patent
Aoki et al.

(10) Patent No.: US 10,627,218 B2
(45) Date of Patent: Apr. 21, 2020

(54) IMAGING APPARATUS

(71) Applicant: HITACHI AUTOMOTIVE SYSTEMS, LTD., Hitachinaka-shi, Ibaraki (JP)

(72) Inventors: Toshiyuki Aoki, Tokyo (JP); Yoshiyuki Sasada, Hitachinaka (JP); Mirai Higuchi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 324 days.

(21) Appl. No.: 14/422,239

(22) PCT Filed: Jul. 26, 2013

(86) PCT No.: PCT/JP2013/070276
§ 371 (c)(1),
(2) Date: Feb. 18, 2015

(87) PCT Pub. No.: WO2014/050288
PCT Pub. Date: Apr. 3, 2014

(65) Prior Publication Data
US 2015/0226541 A1 Aug. 13, 2015

(30) Foreign Application Priority Data

Sep. 28, 2012 (JP) .................................. 2012-215454

(51) Int. Cl.
*G01B 11/14* (2006.01)
*H04N 5/361* (2011.01)
(Continued)

(52) U.S. Cl.
CPC .............. *G01B 11/14* (2013.01); *G03B 13/20* (2013.01); *G03B 13/36* (2013.01);
(Continued)

(58) Field of Classification Search
None
See application file for complete search history.

(56) References Cited

U.S. PATENT DOCUMENTS 6,385,334 B1 5/2002 Saneyoshi et al.
2005/0280702 A1* 12/2005 Nakano .............. H04N 13/0239
348/42

(Continued)

FOREIGN PATENT DOCUMENTS

| JP | 11259632 A1 | 9/1999 |
|----|-------------|--------|
| JP | 2001167276 A1 | 6/2001 |
| JP | 2010-206521 A | 9/2010 |
| JP | 2010-213083 A | 9/2010 |
| WO | 2011/083669 A1 | 7/2011 |

OTHER PUBLICATIONS

Japanese Office Action for Appln. No. 2012-215454, dated Feb. 9, 2016 (14 pages).

*Primary Examiner* — Mohammed S Rahaman
(74) *Attorney, Agent, or Firm* — Volpe and Koenig, P.C.

(57) ABSTRACT

An imaging apparatus includes a first imaging element that receives light having passed through a first optical element and outputs an image which has a luminance value corresponding to intensity of the light and is processed as a reference image. A second imaging element receives light having passed through a second optical element and outputs an image which has a luminance value corresponding to intensity of the light and is processed as a reference image. A distance calculation device calculates a distance image on the basis of the reference image and the comparison image, and recognition device recognizes an object on the basis of the distance image calculated by the distance calculation apparatus, in which the optical elements or the imaging elements satisfy at least one of conditions in which transmittance of the first optical element is higher than transmittance of the second optical element.

11 Claims, 5 Drawing Sheets

(51) Int. Cl.
  *H04N 5/365* (2011.01)
  *G03B 13/36* (2006.01)
  *G06K 9/00* (2006.01)
  *H04N 5/225* (2006.01)
  *H04N 5/367* (2011.01)
  *G03B 13/20* (2006.01)
  *H04N 5/217* (2011.01)
  *H04N 5/232* (2006.01)
  *H04N 5/357* (2011.01)
  *H04N 13/239* (2018.01)
  *G06K 9/62* (2006.01)
  *H04N 13/00* (2018.01)
  *H04N 7/18* (2006.01)

(52) U.S. Cl.
  CPC ..... *G06K 9/00201* (2013.01); *G06K 9/00805* (2013.01); *G06K 9/6202* (2013.01); *H04N 5/2176* (2013.01); *H04N 5/2254* (2013.01); *H04N 5/2258* (2013.01); *H04N 5/23229* (2013.01); *H04N 5/3572* (2013.01); *H04N 5/361* (2013.01); *H04N 5/365* (2013.01); *H04N 5/367* (2013.01); *H04N 13/239* (2018.05); *H04N 7/181* (2013.01); *H04N 2013/0081* (2013.01)

(56) References Cited

U.S. PATENT DOCUMENTS

| | | | |
|---|---|---|---|
| 2006/0115163 A1* | 6/2006 | Nagaoka | G06T 5/50 382/209 |
| 2008/0199069 A1* | 8/2008 | Schick | G01S 11/12 382/154 |
| 2009/0153664 A1* | 6/2009 | Higuchi | G06K 9/00805 348/148 |
| 2010/0225746 A1* | 9/2010 | Shpunt | G01B 11/2518 348/50 |
| 2011/0012997 A1* | 1/2011 | Koguchi | H04N 13/0025 348/47 |
| 2011/0069151 A1* | 3/2011 | Orimoto | G03B 35/00 348/42 |
| 2011/0141297 A1* | 6/2011 | Orimoto | G03B 5/00 348/208.4 |
| 2012/0028678 A1* | 2/2012 | Lim | H04N 5/2355 455/556.1 |
| 2012/0229628 A1* | 9/2012 | Ishiyama | H04N 5/23212 348/135 |
| 2012/0230549 A1* | 9/2012 | Takahashi | H04N 13/0011 382/106 |
| 2013/0100249 A1* | 4/2013 | Norita | G01B 11/245 348/46 |
| 2013/0229513 A1* | 9/2013 | Ichitani | G02B 27/1066 348/135 |

\* cited by examiner

[FIG. 1]
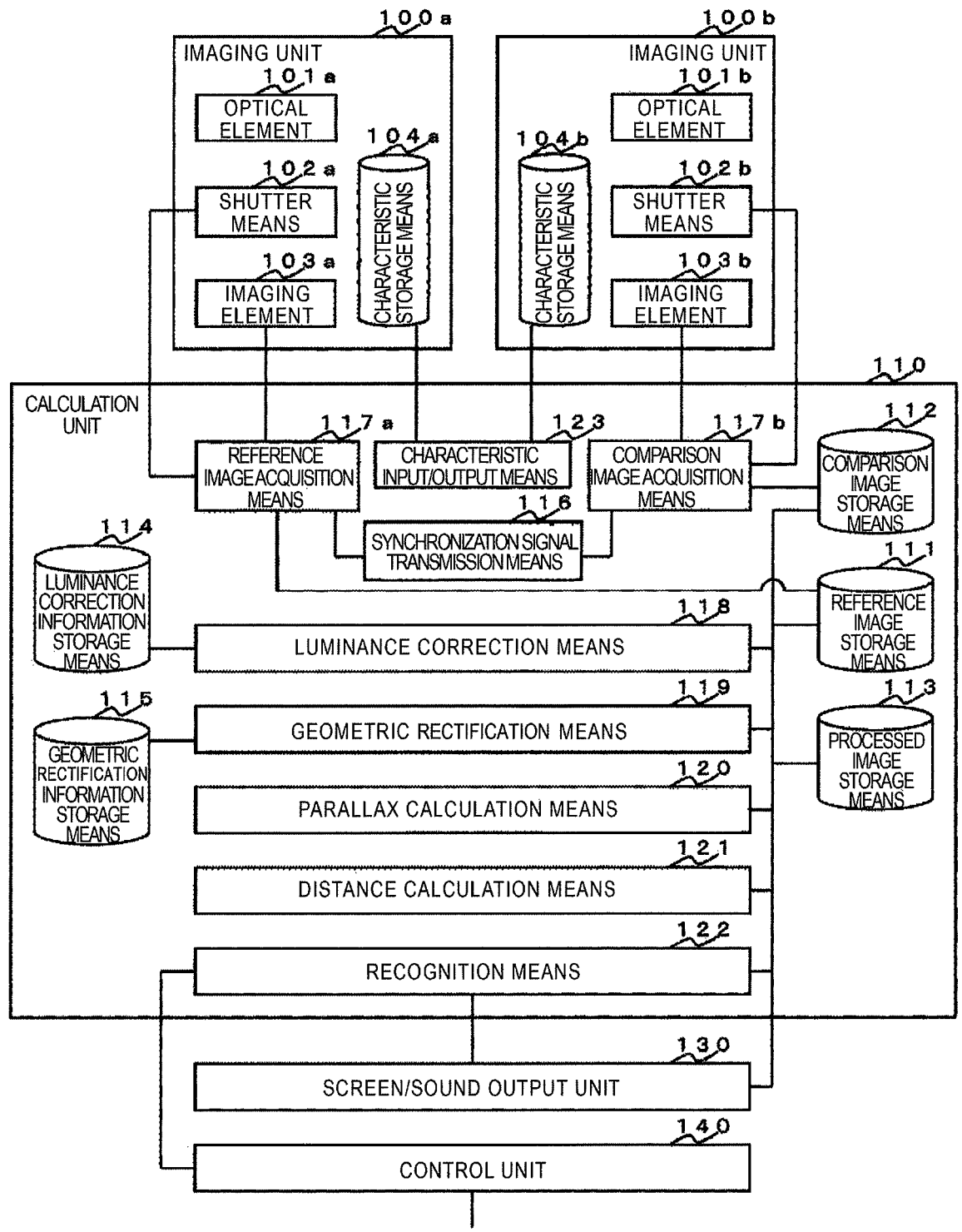

[FIG. 2]
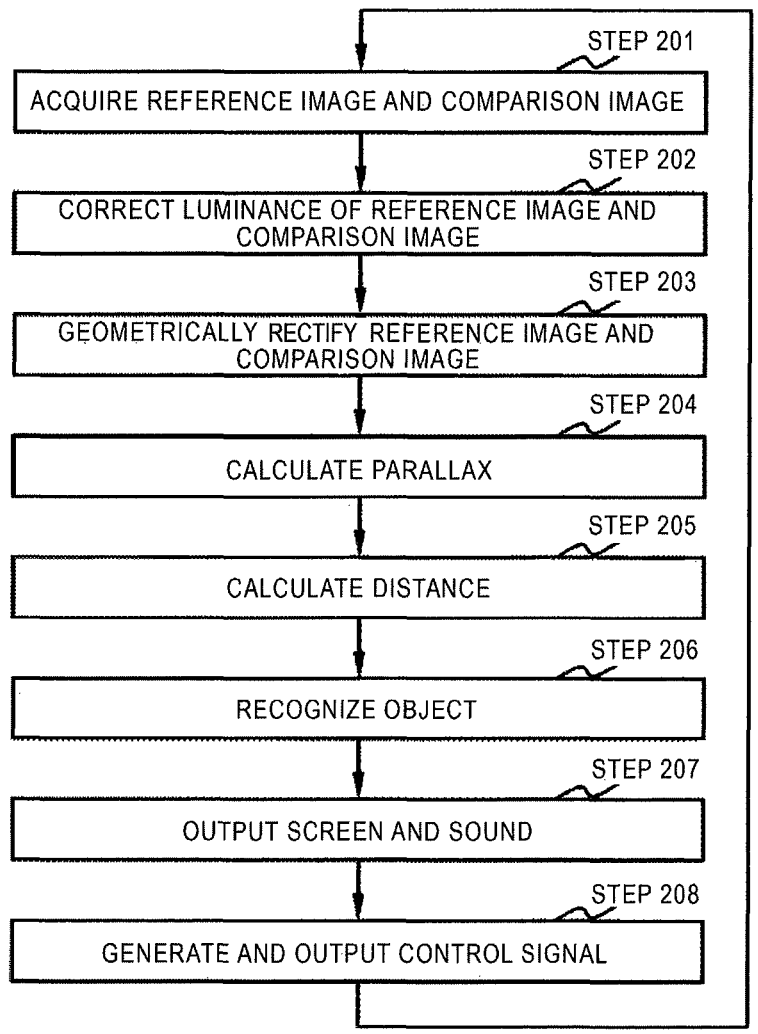
[FIG. 3]
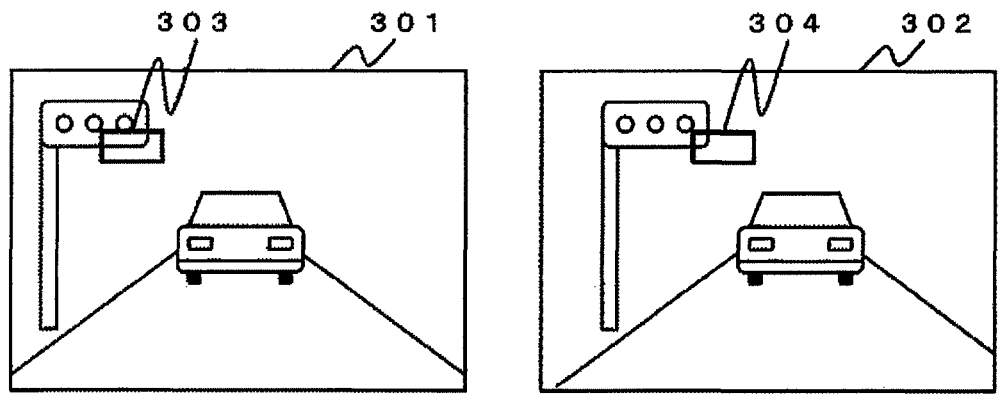

[FIG. 4]
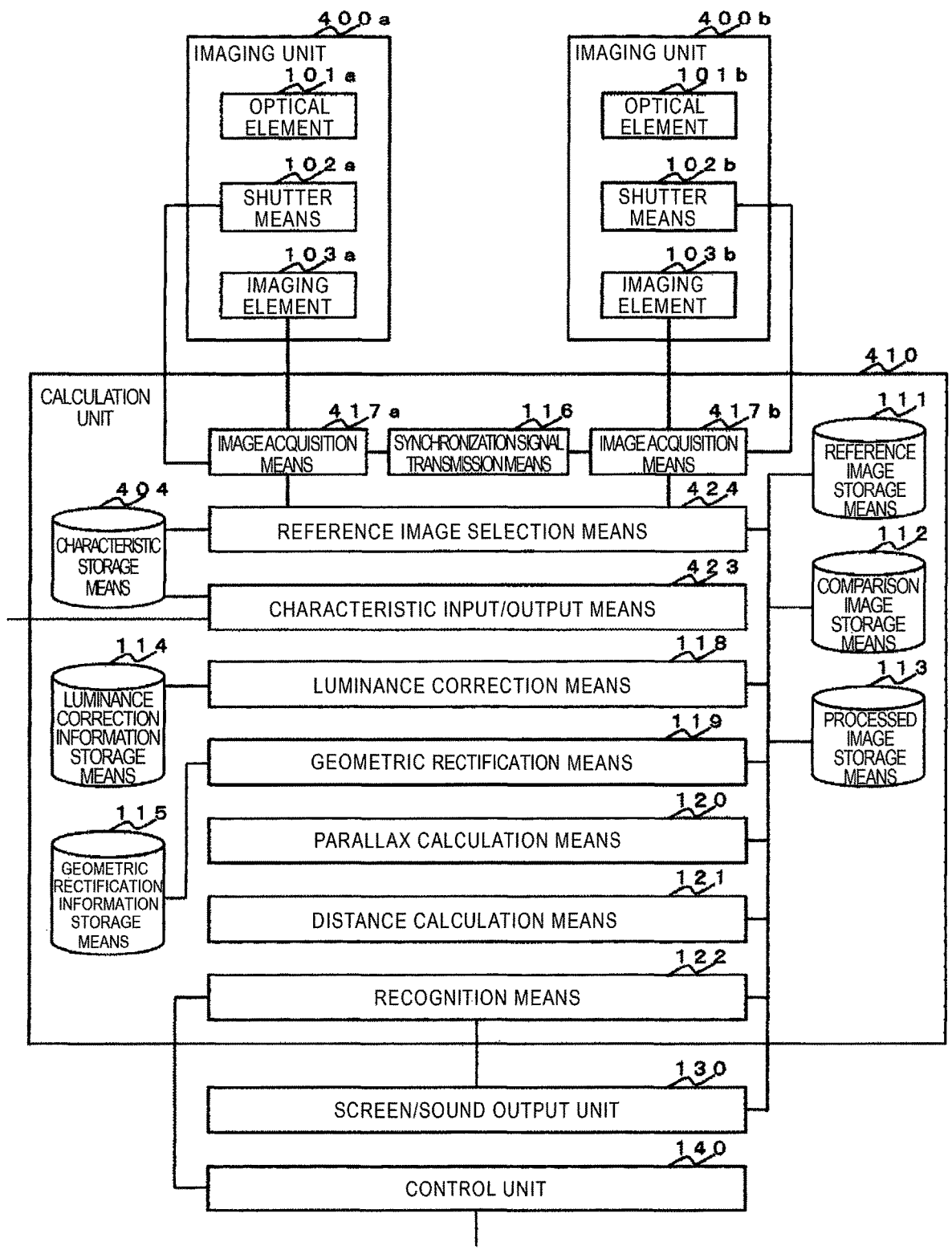

[FIG. 5]
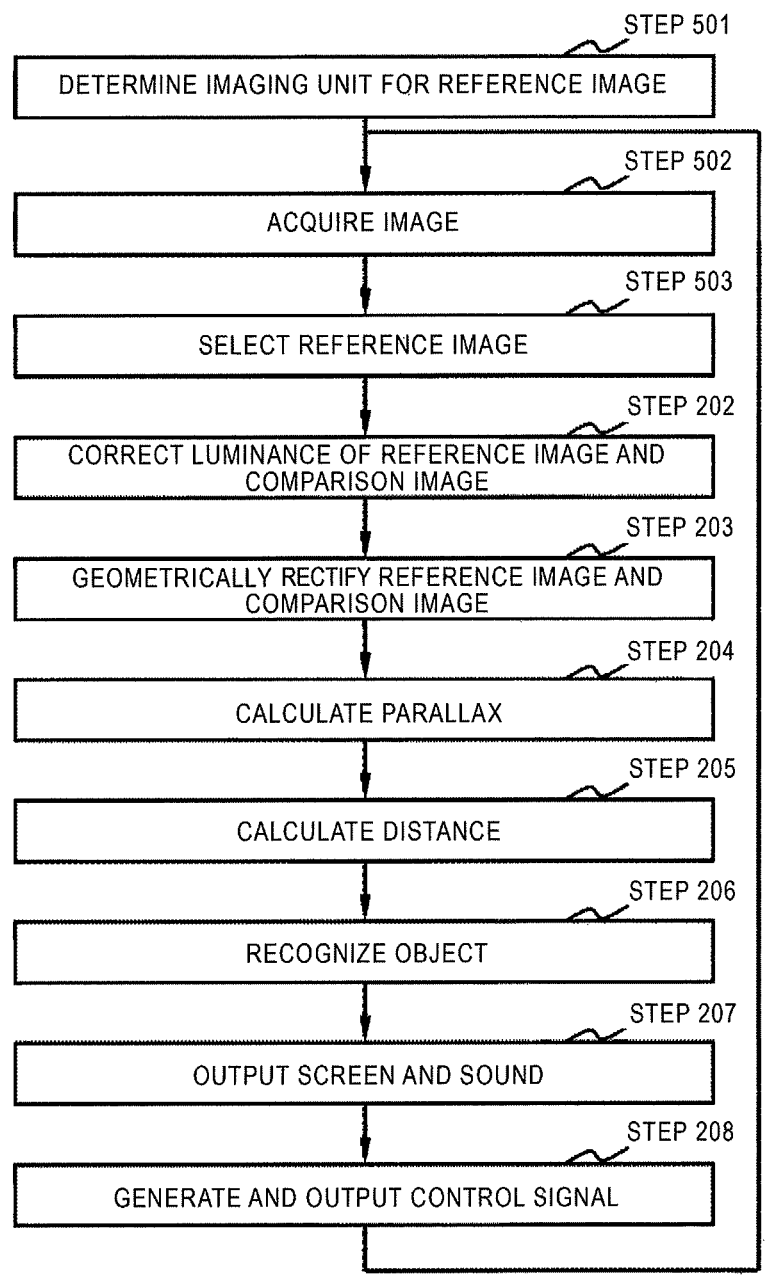

[FIG. 6]
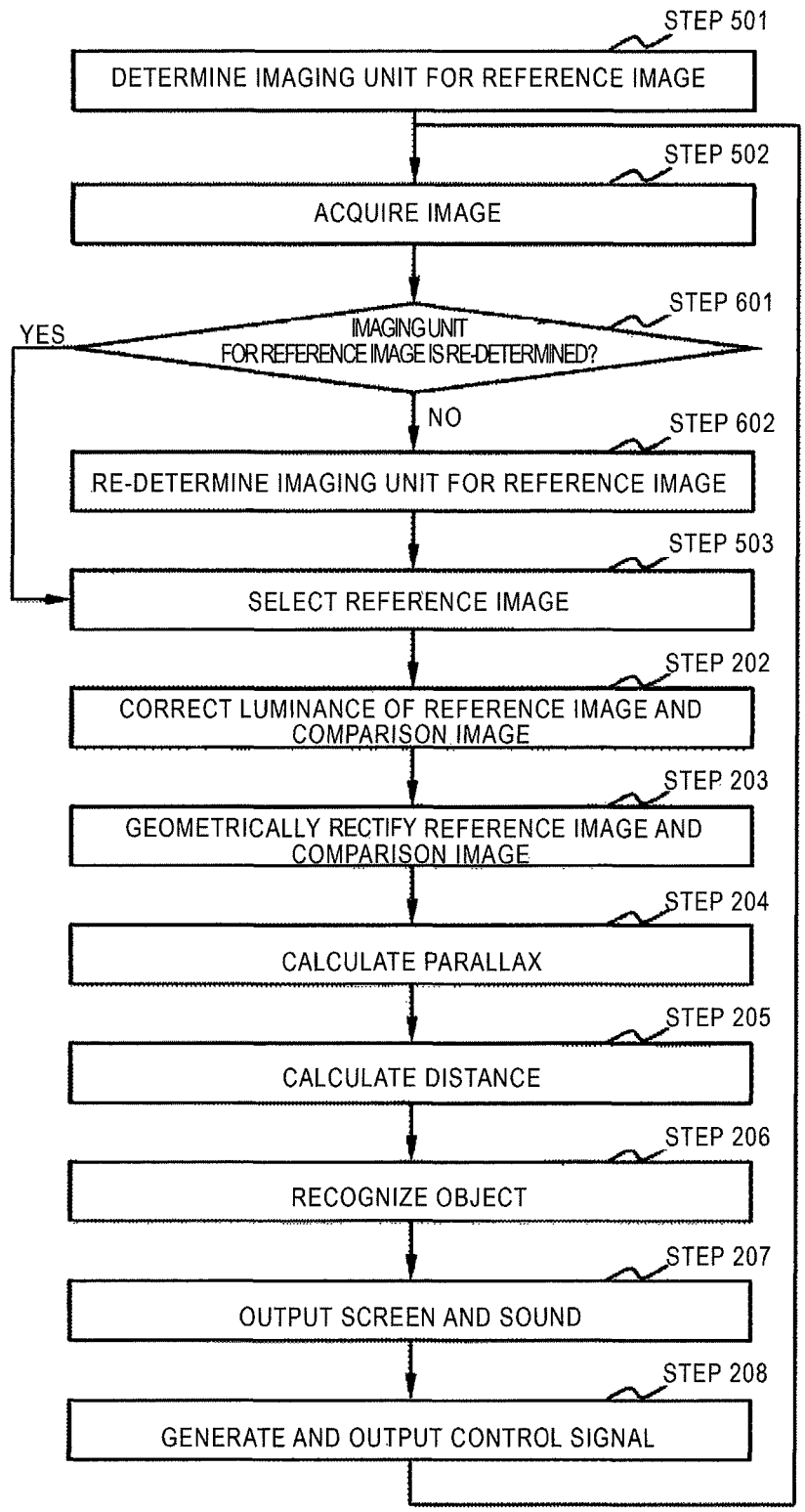

IMAGING APPARATUS

TECHNICAL FIELD

The present invention relates to an imaging apparatus which calculates a distance image (range image) from a plurality of captured images.

BACKGROUND ART

In the related art, as disclosed in PTL 1, an imaging element for a template image (reference image) has sensitivity on a longer wavelength side than an imaging element for a searched image (comparison image) in calculation of a distance image; three-dimensional information of an object is calculated by using a function which defines a relationship between focal length information or aberration information and a wavelength component; and three-dimensional measurement accuracy is prevented from deteriorating due to variations in a focal length, an aberration characteristic, or the like for each wavelength in a wide wavelength band.

CITATION LIST

Patent Literature

PTL 1: International Publication No. WO2011/083669

SUMMARY OF INVENTION

Technical Problem

Imaging elements have variations in sensitivity characteristics, noise, defective pixels, and the like for each imaging element. In addition, lenses have variations in transmittance, distortion, and the like for each lens. For this reason, in PTL 1, due to performance variations of the imaging elements and the lenses, quality of an image used for a recognition process varies, and recognition performance varies for each of the imaging apparatuses.

From the above description, an object of the present invention is to provide an imaging apparatus capable of improving recognition performance and reducing variations in the recognition performance for each imaging apparatus.

Solution to Problem

In order to solve the above-described problem, according to the present invention, there is providing an imaging apparatus including a first optical element; a first imaging element that receives light having passed through the first optical element, and outputs an image which has a luminance value corresponding to intensity of the light and is processed as a reference image; a second optical element; a second imaging element that receives light having passed through the second optical element, and outputs an image which has a luminance value corresponding to intensity of the light and is processed as a reference image; distance calculation means for calculating a distance image on the basis of the reference image and the comparison image; and recognition means for recognizing an object on the basis of the distance image, in which the first optical element and the second optical element, or the first imaging element and the second imaging element satisfy at least one of conditions in which transmittance of the first optical element is higher than transmittance of the second optical element; a distortion of the first optical element is smaller than a distortion of the second optical element; a sensitivity characteristic of the first imaging element is higher than a sensitivity characteristic of the second imaging element; a level of noise of the first imaging element is lower than a level of noise of the second imaging element; the number of defective pixels of the first imaging element is smaller than the number of defective pixels of the second imaging element; a sensitivity characteristic of the first imaging element which receives light having passed through the first optical element is higher than a sensitivity characteristic of the second imaging element which receives light having passed through the second optical element; and a level of noise of the first imaging element which receives light having passed through the first optical element is lower than a level of noise of the second imaging element which receives light having passed through the second optical element.

In addition, there is provided an imaging apparatus including a first optical element; a first imaging element that receives light having passed through the first optical element, and outputs a first image which has a luminance value corresponding to intensity of the light; a second optical element; a second imaging element that receives light having passed through the second optical element, and outputs a second image which has a luminance value corresponding to intensity of the light; reference image selection means for selecting one image satisfying a predetermined condition, of the first image and the second image, as a reference image, and selecting the other image as a comparison image; distance calculation means for calculating a distance image on the basis of the reference image and the comparison image; and recognition means for recognizing an object on the basis of the distance image calculated by the distance calculation means, in which the predetermined condition in the reference image selection means is related to at least one of an image in which transmittance is higher when the transmittance of the first optical element is compared with the transmittance of the second optical element; an image in which a distortion is smaller when the distortion of the first optical element is compared with the distortion of the second optical element; an image in which a sensitivity characteristic is higher when the sensitivity characteristic of the first imaging element is compared with the sensitivity characteristic of the second imaging element; an image in which a level of noise is lower when the level of noise of the first imaging element is compared with the level of noise of the second imaging element; an image in which the number of defective pixels is smaller when the number of defective pixels of the first imaging element is compared with the number of defective pixels of the second imaging element; an image in which a sensitivity characteristic is higher when the sensitivity characteristic of the first imaging element which receives light having passed through the first optical element is compared with the sensitivity characteristic of the second imaging element which receives light having passed through the second optical element; and an image in which a level of noise is lower when the level of noise of the first imaging element which receives light having passed through the first optical element is compared with the level of noise of the second imaging element which receives light having passed through the second optical element.

Further, there is provided an imaging apparatus including a first optical element; a first imaging element that receives light having passed through the first optical element, and outputs a first image which has a luminance value corresponding to intensity of the light; a second optical element; a second imaging element that receives light having passed through the second optical element, and outputs a second image which has a luminance value corresponding to intensity of the light; characteristic storage means for storing at least one piece of characteristic information such as distortions of the first optical means and the second optical means, sensitivity characteristics, levels of noise, and the number of defective pixels of the first imaging means and the second imaging means, and sensitivity characteristics and the levels of noise of the first imaging means which receives light having passed through the first optical means and the second imaging means which receives light having passed through the second optical means; reference image selection means for selecting one image satisfying a predetermined condition, as a reference image, and selecting the other image as a comparison image, on the basis of the characteristic information stored in the characteristic storage means; distance calculation means for calculating a distance image on the basis of the reference image and the comparison image; and recognition means for recognizing an object on the basis of the distance image calculated by the distance calculation means, in which the predetermined condition in the reference image selection means is related to at least one of an image in which transmittance is higher when the transmittance of the first optical element is compared with the transmittance of the second optical element; an image in which a distortion is smaller when the distortion of the first optical element is compared with the distortion of the second optical element; an image in which a sensitivity characteristic is higher when the sensitivity characteristic of the first imaging element is compared with the sensitivity characteristic of the second imaging element; an image in which a level of noise is lower when the level of noise of the first imaging element is compared with the level of noise of the second imaging element; an image in which the number of defective pixels is smaller when the number of defective pixels of the first imaging element is compared with the number of defective pixels of the second imaging element; an image in which a sensitivity characteristic is higher when the sensitivity characteristic of the first imaging element which receives light having passed through the first optical element is compared with the sensitivity characteristic of the second imaging element which receives light having passed through the second optical element; and an image in which a level of noise is lower when the level of noise of the first imaging element which receives light having passed through the first optical element is compared with the level of noise of the second imaging element which receives light having passed through the second optical element.

Advantageous Effects of Invention

According to the present invention, it is possible to provide an imaging apparatus capable of improving recognition performance and reducing variations in the recognition performance for each imaging apparatus.

BRIEF DESCRIPTION OF DRAWINGS

FIG. 1 is a diagram illustrating a configuration of an imaging apparatus according to an embodiment of the present invention.

FIG. 2 is a diagram illustrating an operation example of the imaging apparatus of FIG. 1.

FIG. 3 is a diagram illustrating a reference image and a comparison image in the imaging apparatus of the present invention.

FIG. 4 is a diagram illustrating a configuration of an imaging apparatus according to another embodiment of the present invention.

FIG. 5 is a diagram illustrating an operation example of the imaging apparatus of FIG. 4.

FIG. 6 is a diagram illustrating another operation example of the imaging apparatus of FIG. 4.

DESCRIPTION OF EMBODIMENTS

Embodiment 1

FIG. 1 illustrates a configuration of an imaging apparatus according to an embodiment of the present invention.

The imaging apparatus according to the embodiment of the present invention includes an imaging unit (first imaging unit) 100a, an imaging unit (second imaging unit). 100b, a calculation unit 110, a screen/sound output unit 130, and a control unit 140.

The imaging unit 100a such as a camera includes an optical element (first optical element) 101a, shutter means (first shutter means) 102a, an imaging element (first imaging element) 103a, and characteristic storage means 104a.

The optical element 101a such as a lens refracts light and forms an image on the imaging element.

The shutter means 102a such as a shutter, which is provided at a location through which light having passed through the optical element 101a passes, opens a shutter mechanism so that the light passes therethrough only for an exposure time during photographing, and closes the shutter mechanism so that the light is blocked for a non-exposure time.

The imaging element 103a receives an image of the light refracted by the optical element 101a, and generates an image corresponding to intensity of the light.

The characteristic storage means 104a stores information regarding transmittance, distortion, and the like of the optical element 101a, information regarding a sensitivity characteristic, noise, the number of defective pixels, and the like of the imaging element 103a, and information regarding a sensitivity characteristic, noise, and the like of the imaging unit 100a. The information regarding distortion of the optical element 101a includes a distortion coefficient of a lens in a radial direction, a distortion coefficient of a lens in a tangential direction, and the like. The information regarding a sensitivity characteristic of the imaging element 103a includes a dynamic range, a luminance value of an image obtained by imaging an object with uniform light, and the like. The information regarding noise of the imaging element 103a includes an SN ratio, a standard deviation (variation) of luminance values of an image obtained by imaging an object with uniform light, shot noise of light with predetermined intensity, dark current noise, reading noise, fixed pattern noise of light with predetermined intensity, and the like. The information regarding a sensitivity characteristic of the imaging unit 100a includes a dynamic range of the imaging element 103a which receives light having passed through the optical element 101a, a luminance value of an image of the imaging element 103a which receives light having passed through the optical element 101a when an object is imaged with uniform light, and the like. The information regarding noise of the imaging unit 100a includes an SN ratio of the imaging element 103a which receives light having passed through the optical element 101a, a standard deviation (variation) of luminance values of an image of the imaging element 103a which receives light having passed through the optical element 101a when an object is imaged with uniform light, shot noise of the imaging element 103a which receives light having passed through the optical element 101a when light with predetermined intensity is incident, dark current noise of the imaging element 103a which receives light having passed through the optical element 101a, reading noise of the imaging element 103a which receives light having passed through the optical element 101a, fixed pattern noise of the imaging element 103a which receives light having passed through the optical element 101a when light with predetermined intensity is incident, and the like.

The imaging unit 100b such as a camera includes an optical element (second optical element) 101b, shutter means (second shutter means) 102b, an imaging element (second imaging element) 103b, and characteristic storage means 104b. In addition, design values of focal lengths of the imaging unit 100a and the imaging unit 100b are the same as each other. Directions of optical axes of the imaging unit 100a and the imaging unit 100b are substantially the same as each other.

The optical element 101b such as a lens refracts light and forms an image on the imaging element.

The shutter means 102b such as a shutter, which is provided at a location through which light having passed through the optical element 101b passes, opens a shutter mechanism so that the light passes therethrough only for an exposure time during photographing, and closes the shutter mechanism so that the light is blocked for a non-exposure time.

The imaging element 103b receives an image of the light refracted by the optical element 101b, and generates an image corresponding to intensity of the light.

The characteristic storage means 104b stores information regarding transmittance, distortion, and the like of the optical element 101b, information regarding a sensitivity characteristic, noise, the number of defective pixels, and the like of the imaging element 103b, and information regarding a sensitivity characteristic, noise, and the like of the imaging unit 100b. The information regarding distortion of the optical element 101b includes a distortion coefficient of a lens in a radial direction, a distortion coefficient of a lens in a tangential direction, and the like. The information regarding a sensitivity characteristic of the imaging element 103b includes a dynamic range, a luminance value of an image obtained by imaging an object with uniform light, and the like. The information regarding noise of the imaging element 103b includes an SN ratio, a standard deviation (variation) of luminance values of an image obtained by imaging an object with uniform light, shot noise of light with predetermined intensity, dark current noise, reading noise, fixed pattern noise of light with predetermined intensity, and the like. The information regarding a sensitivity characteristic of the imaging unit 100b includes a dynamic range of the imaging element 103b which receives light having passed through the optical element 101b, a luminance value of an image of the imaging element 103b which receives light having passed through the optical element 101b when an object is imaged with uniform light, and the like. The information regarding noise of the imaging unit 100b includes an SN ratio of the imaging element 103b which receives light having passed through the optical element 101b, a standard deviation (variation) of luminance values of an image of the imaging element 103b which receives light having passed through the optical element 101b when an object is imaged with uniform light, shot noise of the imaging element 103b which receives light having passed through the optical element 101b when light with predetermined intensity is incident, dark current noise of the imaging element 103a which receives light having passed through the optical element 101b, reading noise of the imaging element 103b which receives light having passed through the optical element 101b, fixed pattern noise of the imaging element 103b which receives light having passed through the optical element 101b when light with predetermined intensity is incident, and the like.

The imaging unit 100a and the imaging unit 100b include the optical element 101a and the optical element 101b or the imaging element 103a and the imaging element 103b, satisfying one item a among the following items 1-1 to 1-7 which are set in advance. In a case where a plurality of imaging apparatuses are manufactured, the imaging apparatuses are configured to satisfy an item a which is a predetermined condition.

Item 1-1: The transmittance of the optical element 101a is higher than that of the optical element 101b.
Item 1-2: The distortion of the optical element 101a is smaller than that of the optical element 101b.
Item 1-3: The sensitivity characteristic of the imaging element 103a is higher than that of the imaging element 103b.
Item 1-4: The level of noise of the imaging element 103a is lower than that of the imaging element 103b.
Item 1-5: The number of defective pixels of the imaging element 103a is smaller than that of the imaging element 103b.
Item 1-6: The sensitivity characteristic of the imaging unit 100a is higher than that of the imaging unit 100b.
Item 1-7: The level of noise of the imaging unit 100a is lower than that of the imaging unit 100b.

The calculation unit 110 constituted by a central processing unit (CPU), a memory, and the like includes reference image storage means 111, comparison image storage means 112, processed image storage means 113, luminance correction information storage means 114, geometric rectification information storage means 115, synchronization signal transmission means 116, reference image acquisition means 117a, comparison image acquisition means 117b, luminance correction means 118, geometric rectification means 119, disparity calculation means 120, distance calculation means 121, recognition means 122, and characteristic input/output means 123.

The reference image storage means 111 such as a memory or hard disk stores an image captured by the imaging unit 100a. In disparity calculation, a template image is cut out from the image stored in the reference image storage means 111, and thus the stored image is a reference image.

The comparison image storage means 112 such as a memory or a hard disk stores an image captured by the imaging unit 100b. In the disparity calculation, the image stored in the comparison image storage means 112 is searched for by using a template image, and thus the stored image is a comparison image.

The processed image storage means 113 such as a memory, or a hard disk stores an image which is processed and generated by the calculation unit 110.

The luminance correction information storage means 114 such as a memory or a hard disk stores a luminance correction coefficient of each pixel of images (a reference image and a comparison image) of the imaging unit 100a and the imaging unit 100b. The correction coefficient is a value at which the luminance of an image obtained by capturing an object with uniform light is the same in the entire image.

The geometric rectification information storage means 115 such as a memory or a hard disk stores a geometric rectification amount of each pixel of images (a reference image and a comparison image) of the imaging unit 100a and the imaging unit 100b. The rectification amount is a value for rectification to an image in which distortions of the optical element 101a and the optical element 101b, and errors of focal lengths, errors of optical axis positions on images and mounting errors of the imaging unit 100a and the imaging unit 100b are 0.

The synchronization signal transmission means 116 generates and transmits a synchronization signal.

The reference image acquisition means 117a sends a signal for opening the shutter to the shutter means 102a and acquires an image generated by the imaging element 103a, in synchronization with the synchronization signal from the synchronization signal transmission means 116.

The comparison image acquisition means 117b sends a signal for opening the shutter to the shutter means 102b and acquires an image generated by the imaging element 103b, in synchronization with the synchronization signal from the synchronization signal transmission means 116.

The luminance correction means 118 reads the luminance correction coefficient of each pixel from the luminance correction information storage means 114 so as to correct luminance of a reference image and a comparison image.

The geometric rectification means 119 reads a two-dimensional geometric rectification amount of each pixel from the geometric rectification information storage means 115 so as to geometrically rectify the reference image and the comparison image, thereby rectifying shapes of reflected pictures.

The disparity calculation means 120 searches for a region of the comparison image, corresponding to a region (template image) which has a predetermined size and is extracted from the reference image. A difference between a position of the region on the comparison image matching the template image and a position of the template image on the reference image, that is, disparity is calculated. Disparity is calculated for each pixel, and thus a disparity image is calculated.

The distance calculation means 121 calculates a distance (range) from the imaging apparatus to an object on the images in the optical axis directions of the imaging unit 100a and the imaging unit 100b on the basis of the disparity calculated by the disparity calculation means 120, distances (baseline lengths) of foci and focal lengths of the imaging unit 100a and the imaging unit 100b. The distance is calculated for each pixel, and thus a distance image is calculated.

The recognition means 122 recognizes, the object reflected in the reference image and a position of the object on the reference image, and calculates a three-dimensional relative position and relative speed of the object for the imaging apparatus, by using the reference image and the distance image. Here, a three-dimensional relative position coordinate system of the imaging apparatus has an x coordinate in the right direction, a y coordinate in the upward direction, and a z coordinate in the optical axis direction with respect to the imaging unit 100a and the imaging unit 100b, with a midpoint between the foci of the imaging unit 100a and the imaging unit 100b as an origin. In addition, on the basis of relative positions and relative speeds of the imaging apparatus and the object, time to collision is calculated, and it is determined whether or not the collision will occur within a predetermined time. The relative positions and the relative speeds of the imaging apparatus and the object, a collision determination result, and the time to collision are sent to the screen/sound output unit 130 and the control unit 140.

The characteristic input/output means 123 acquires the information regarding transmittance, distortion, and the like of the optical element 101a and the optical element 101b, the information regarding a sensitivity characteristic, noise, the number of defective pixels and the like of the imaging element 103a and the imaging element 103b, or the information regarding a sensitivity characteristic, noise, and the like of the imaging unit 100a and the imaging unit 100b, stored in the characteristic storage means 104a and the characteristic storage means 104b, and outputs the information to outside of the imaging apparatus.

The screen/sound output unit 130 such as a monitor and a speaker displays the reference image or the disparity image, and the distance image on the screen. In addition, a frame or a marker is displayed at the position of the object. In this case, a color of a frame or a marker of an object of which a collision determination result from the recognition means 122 indicates collision is set to be different from that of an object of which a collision determination result is non-collision. In a case where there is an object of which a collision determination result from the recognition means 122 indicates collision, a warning sound is output.

The control unit 140 such as a CPU generates a control signal on the basis of the relative positions and relative speeds of the imaging apparatus and the object, the collision time, and the collision determination result, and outputs the control signal to the outside of the imaging apparatus.

With reference to FIG. 2, a description will be made of operation procedures of the imaging apparatus according to the embodiment of the present invention illustrated in FIG. 1.

Step 201: The synchronization signal transmission means 116 generates a synchronization signal and sends the synchronization signal to the reference image acquisition means 117a and the comparison image acquisition means 117b. The reference image acquisition means 117a sends a shutter opening/closing signal and exposure time information to the shutter means 102a right after receiving the synchronization signal from the synchronization signal transmission means 116. The shutter means 102a opens the shutter mechanism only for the exposure time right after receiving the shutter opening/closing signal and the exposure time information from the reference image acquisition means 117a, and then closes the shutter mechanism. The imaging element 103a receives an image of light refracted by the optical element 101a, generates an image corresponding to the intensity of the light, and sends the image to the reference image acquisition means 117a. The reference image acquisition means 117a receives the image from the imaging element 103a and stores the image in the reference image storage means 111.

The comparison image acquisition means 117b sends a shutter opening/closing signal and exposure time information to the shutter means 102b right after receiving the synchronization signal from the synchronization signal transmission means 116. The shutter means 102b opens the shutter mechanism only for the exposure time right after receiving the shutter opening/closing signal and the exposure time information from the comparison image acquisition means 117b, and then closes the shutter mechanism. The imaging element 103b receives an image of light refracted by the optical element 101b, generates an image corresponding to the intensity of the light, and sends the image to the comparison image acquisition means 117b. The comparison image acquisition means 117b receives the image from the imaging element 103b and stores the image in the comparison image storage means 112.

Step 202: The luminance correction means 118 reads a correction coefficient of each pixel of the images generated by the imaging element 103a and the imaging element 103b from the luminance correction information storage means 114, and reads the reference image and the comparison image from the reference image storage means 111 and the comparison image storage means 112, respectively. A luminance value of the reference image is corrected by multiplying the correction coefficient of each pixel of the image generated by the imaging element for the reference image by a luminance value of each pixel of the reference image. Similarly, a luminance value of the comparison image is corrected by multiplying the correction coefficient of each pixel of the image generated by the imaging element for the comparison image by a luminance value of each pixel of the comparison image. The corrected reference image and comparison image are respectively stored in the reference image storage means 111 and the comparison image storage means 112.

Step 203: The geometric rectification means 119 reads a two-dimensional geometric rectification amount of each pixel of the images generated by the imaging element 103a and the imaging element 103b from the geometric rectification information storage means 115, and reads the reference image and the comparison image from the reference image storage means 111 and the comparison image storage means 112, respectively. A position on the reference image of which the two-dimensional rectification coefficient is changed is calculated from each pixel of the reference image, and a luminance value of the position is calculated from luminance values around the position through interpolation calculation. This calculation is performed on all pixels of the reference image. Similarly, a position on the comparison image of which the two-dimensional rectification coefficient is changed is calculated from each pixel of the comparison image, and a luminance value of the position is calculated from luminance values around the position through interpolation calculation. This calculation is performed on all pixels of the comparison image. The rectified reference image and comparison image are respectively stored in the reference image storage means 111 and the comparison image storage means 112.

Step 204: The disparity calculation means 120 extracts an image 303 (template image) of a region with a predetermined size on the reference image 301 as illustrated in FIG. 3. An image of a region in which the same object as in the template image 303 is reflected is searched for on the comparison image 302. An image 304 of a region with a predetermined size on the comparison image 302 is extracted; a sum of absolute differences (SAD) between luminance values of the template image 303 on the reference image 301 and luminance values of the image 304 of the region with the predetermined size on the comparison image 302 is calculated for each image 304 of each region on the comparison image 302; and a distance between the image 304 of the region with the smallest value on the comparison image 302 and the region of the template image 303, that is, disparity is calculated. This process is performed on all regions on the reference image 301, so as to calculate disparity for the entire reference image 301. A disparity image calculated in the above-described manner is stored in the processed image storage means 113.

Step 205: The distance calculation means 121 reads the disparity image from the processed image storage means 113. A value obtained by multiplying a distance between the foci of the imaging unit 100a and the imaging unit 100b by the focal lengths thereof is divided by the disparity of each region, calculated in step 204, and a distance between a picture reflected in the image 303 of the region on the reference image and the imaging apparatus in the optical axis direction is calculated. This process is performed on all of the regions on the reference image, so that a distance between each picture and the imaging apparatus in the optical axis direction is calculated in the entire reference image. A distance image calculated in the above-described manner is stored in the processed image storage means 113.

Step 206: The recognition means 122 reads the reference image from the reference image storage means 111 and reads the distance image from the processed image storage means 113. Therefore, calculation of a position of a vanishing position on the reference image, a determination of an object such as an automobile or a pedestrian, calculation of a relative position and a relative speed of the object to the imaging apparatus, and a determination of collision between the object and the imaging apparatus are performed.

First, the recognition means 122 calculates a position of a vanishing point on the reference image in the following procedures. White lines of both sides located at lanes on the reference image are detected, and the slopes of the white lines on the reference image are calculated. By using the slopes calculated under the assumption that both of the white lines are straight lines, a position of a point at which both of the white lines intersect each other on the reference image is calculated. This is a position of the vanishing point.

Next, the recognition means 122 detects an object such as an automobile or a pedestrian. In the distance image, a region connected by pixels within a predetermined distance range is obtained. As examples of the predetermined range, there are 5 m to 10 m, 7.5 m to 12.5 m, and 10 m to 15 m, and a plurality of ranges which overlap each other every 2.5 m in a width of 5 m are set. In relation to each region connected by the pixels within the predetermined distance range, vertical and horizontal lengths of the region on the reference image are obtained. A value, obtained by multiplying the vertical length of each region on the reference image, the distance, and a pixel pitch by each other, is divided by the focal length, so that a three-dimensional vertical length of each region is calculated. Similarly, a value, obtained by multiplying the horizontal length of each region on the reference image, the distance, and the pixel pitch by each other, is divided by the focal length, so that a three-dimensional horizontal length of each region is calculated.

By using Equation 1, a vertical position Vg of each region on the reference image with respect to the ground surface is approximately calculated. Here, Vv indicates a height of the vanishing point, f indicates a focal length, Hi indicates a mounting height of the imaging apparatus, Lr indicates a mean distance of the region, and c indicates a pixel pitch. In addition, Equation 1 is a computation expression assuming that the optical axes of the imaging unit 100a and the imaging unit 100b are substantially present in the horizontal direction.

$$Vg = Vv - f \times Hi/(Lr \times c) \qquad \text{[Equation 1]}$$

In a case where the three-dimensional vertical and horizontal lengths of the region are within predetermined ranges of an automobile, and a difference between a lower limit vertical position of the region on the reference image and a vertical position of the region on the reference image from the ground surface, calculated by using Equation 1, is within a threshold value, the object of the region is, determined as being an automobile. Similarly, in a case where the three-dimensional vertical and horizontal lengths of the region are within predetermined ranges of a pedestrian, and a difference between a lower limit vertical position of the region on the reference image and a vertical position of the region on the reference image from the ground surface, calculated by using Equation 1, is within a threshold value, an object of the region is determined as being a pedestrian. This process is performed on all of the regions, so that it is determined whether the object is an automobile or a pedestrian.

Next, a relative position and a relative speed of the object to the imaging apparatus are calculated in the following procedures. In relation to the region determined as being the automobile or the pedestrian, relative positions (Xo, Yo, and Zo) of the object to the imaging apparatus is calculated by using Equation 2 to Equation 4. Here, (Uo and Vo) indicate a position of a center of region determined as being the automobile or the pedestrian on the reference image.

$$Xo = Lr \times cx \times Uo/f \qquad \text{[Equation 2]}$$

$$Yo = H + Lr \times cx \times (Vo - Vv)/f \qquad \text{[Equation 3]}$$

$$Zo = Lr \qquad \text{[Equation 4]}$$

The processes of steps 201 to 208 are repeatedly performed in a predetermined cycle. In a case where a difference between the positions of regions on the reference image, detected in the previous and present processes of step 206 is within a predetermined value, the same object is determined. A value obtained by subtracting the relative position calculated in the previous process of step 206 from the relative position of the object to the imaging apparatus, calculated in the present process, is divided by a time interval of the process cycle of steps 201 to 208, so that relative speeds (Vx, Vy, and Vz) of the object to the imaging apparatus are calculated.

Finally, collision between the object and the imaging apparatus is determined in the following procedures. In a case where the relative speed Vz of the object to the imaging apparatus is 0 or higher, it is determined that collision with the object of the region determined as being the automobile or the pedestrian will not occur. If the relative speed Vz of the object to the imaging apparatus is a negative value, the relative position Zo of the object to the imaging apparatus, calculated in the present process, is divided by the absolute value of the relative speed Vz of the object to the imaging apparatus so that the time to collision (collision time) is calculated. A value, obtained by multiplying the collision time to the relative speed Vx of the object to the imaging apparatus, is added to the relative position Xo of the object, so that the relative position Xo of the object to the imaging apparatus at the time of the collision is calculated. Therefore, in a case where the relative speed Vz of the object to the imaging apparatus is a negative value, the collision time is within a threshold value, and an absolute value of the relative position Xo of the object to the imaging apparatus at the time of the collision is within a threshold value, it is determined that collision with the object of the region determined as the automobile or the pedestrian will occur. Otherwise, it is determined that collision will not occur. The recognition means 122 sends positions of four corners of the region determined as being the automobile or the pedestrian on the reference image, the relative positions and the relative speeds of the object to the imaging apparatus, the collision determination result, and the collision time, to the screen/sound output unit 130 and the control unit 140.

Step 207: The screen/sound output unit 130 receives the positions of four corners of the region determined as being the automobile or the pedestrian on the reference image, the relative positions and the relative speeds of the object to the imaging apparatus, the collision determination result, and the collision time, from the recognition means 122. The reference image is read from the reference image storage means 111. The reference image is displayed on a screen, and the region determined as being the automobile or the pedestrian is displayed as a frame. In addition, a color of a frame of a region of which a collision determination result indicates collision is displayed on the screen so at to be changed to a color of a frame of a region of an object of which a collision determination result indicates non-collision. If there is a collision determination result indicating collision in the region, a warning sound is output.

Step 208: The control unit 140 receives the positions of four corners of the region determined as being the automobile or the pedestrian on the reference image, the relative positions and the relative speeds of the object to the imaging apparatus, the collision determination result, and the collision time, from the recognition means 122. If there is a collision determination result indicating collision in the region determined as being the automobile or the pedestrian will occur, a control signal for avoiding the collision is output to the outside of the imaging apparatus.

A description will be made of operation procedures of the imaging apparatus according to the embodiment of the present invention illustrated in FIG. 1.

The characteristic input/output means 123 reads, from the characteristic storage means 104a and the characteristic storage means 104b, the information regarding transmittance and distortions (a distortion coefficient of a lens in a radial direction, a distortion coefficient of a lens in a tangential direction, and the like) of the optical element 101a and the optical element 101b; the information regarding sensitivity characteristics (a luminance value of an image obtained by imaging an object with uniform light, a dynamic range, and the like), noise (an SN ratio, a standard deviation (variation) of luminance values of an image obtained by imaging an object with uniform light, shot noise of light with predetermined intensity, dark current noise, reading noise, fixed pattern noise of light with predetermined intensity, and the like), the number of defective pixels, and the like of the imaging element 103a and the imaging element 103b; and the information regarding sensitivity characteristics (dynamic ranges of the imaging element 103a and the imaging element 103b which receive light having passed through the optical element 101a and the optical element 101b, luminance values of images of the imaging element 103a and the imaging element 103b which receive light having passed through the optical element 101a and the optical element 101b when an object is imaged with uniform light, and the like), noise (SN ratios of the imaging element 103a and the imaging element 103b which receive light having passed through the optical element 101a and the optical element 101b, standard deviations (variations) of luminance values of images of the imaging element 103a and the imaging element 103b which receive light having passed through the optical element 101a and the optical element 101b when an object is imaged with uniform light, shot noise of the imaging element 103a and the imaging element 103b which receive light having passed through the optical element 101a and the optical element 101b when light with predetermined intensity is incident, dark current noise of the imaging element 103a and the imaging element 103b which receive light having passed through the optical element 101a and the optical element 101b, reading noise of the imaging element 103a and the imaging element 103b which receive light having passed through the optical element 101a and the optical element 101b, fixed pattern noise of the imaging element 103a and the imaging element 103b which receive light having passed through the optical element 101a and the optical element 101b when light with predetermined intensity is incident, and the like), and the like of the imaging unit 100a and the imaging unit 100b, and outputs the information to the outside of the imaging apparatus.

According to the operation procedures (FIG. 2) of the imaging apparatus of the embodiment of the present invention illustrated in FIG. 1, the imaging unit 100a for a reference image and the imaging unit 100b include the optical element 101a and the optical element 101b or the imaging element 103a and the imaging element 103b, satisfying one item a among the following items 1-1 to 1-7 which are set in advance.

For this reason, compared with a case of not satisfying the item a, quality of a reference image becomes higher than that of a comparison image, and an object recognition process is performed in step 206 by using the reference image with the higher quality, so that object recognition performance is improved. In addition, if an imaging apparatus is manufactured without taking the item a into consideration, a case of not satisfying the item a occurs. If an imaging apparatus is manufactured so as to satisfy the item a, object recognition performance is improved in this case compared with an imaging apparatus which is manufactured without taking the item a into consideration, and thus it is possible to reduce variations in the object recognition performance for each of imaging apparatuses.

In addition, in step 207, the screen/sound output unit 130 displays a frame with a predetermined color in an object with which it is determined that "collision" will occur on the reference image of the screen, and outputs a warning sound. Therefore, compared with a case of not satisfying the item a, the object recognition performance is improved, and thus it is possible to notify a user of the colliding object more rapidly and more reliably.

In addition, in step S208, if there is an object with which it is determined that "collision" will occur on the reference image of the screen, the control unit generates a control signal for avoiding the collision and outputs to outside of the imaging apparatus. Therefore, compared with a case of not satisfying the item a, the object recognition performance is improved, and therefore it is possible to perform control for avoiding the object more rapidly and more reliably and thus to reduce a possibility of the collision.

Item 1-1: The transmittance of the optical element 101a for a reference image is higher than that of the optical element 101b for a comparison image.

Item 1-2: The distortion of the optical element 101a for a reference image is smaller than that of the optical element 101b for a comparison image.

Item 1-3: The sensitivity characteristic of the imaging element 103a for a reference image is higher than that of the imaging element 103b for a comparison image.

Item 1-4: The level of noise of the imaging element 103a for a reference image is lower than that of the imaging element 103b for a comparison image.

Item 1-5: The number of defective pixels of the imaging element 103a for a reference image is smaller than that of the imaging element 103b for a comparison image.

Item 1-6: The sensitivity characteristic of the imaging unit 100a for a reference image is higher than that of the imaging unit 100b for a comparison image.

Item 1-7: The level of noise of the imaging unit 100a for a reference image is lower than that of the imaging unit 100b for a comparison image.

According to the operation procedures of the imaging apparatus of the embodiment of the present invention illustrated in FIG. 1, the characteristic input/output means 123 reads the information regarding transmittance, distortions, and the like of the optical element 101a and the optical element 101b, the information regarding sensitivity characteristics, noise, the number of defective pixels, and the like of the imaging element 103a and the imaging element 103b, and the information regarding sensitivity characteristics, noise, and the like of the imaging unit 100a and the imaging unit 100b, stored in the characteristic storage means 104a and the characteristic storage means 104b, and outputs the information to outside of the imaging apparatus. Therefore, on the basis of the information values, it is possible to check whether or not one of the above-described items 1-1 to 1-7 is satisfied.

According to the operation procedures (FIG. 2) of the imaging apparatus of the embodiment of the present invention illustrated in FIG. 1, in step 207, the screen/sound output unit 130 displays a frame with a predetermined color in an object with which it is determined that "collision" will occur on the reference image of the screen, and thus it is possible to notify a user of the colliding object.

Further, the imaging apparatus of the present invention is not limited to the above-described embodiment, and may be applied through various modifications. Hereinafter, modification examples of the imaging apparatus of the present invention will be described.

(Modification Example 1-1)

In the embodiment of the imaging apparatus of the present invention illustrated in FIG. 1, also in a case where the imaging unit 100a and the imaging unit 100b include the optical element 101a and the optical element 101b or the imaging element 103a and the imaging element 103b, satisfying one item b among the following items 1-11 to 1-30 which are predetermined conditions set in advance, compared with a case of not satisfying the item b, quality of a reference image becomes higher than that of a comparison image, and an object recognition process is performed in step 206 by using the reference image with the higher quality, so that object recognition performance is improved.

In addition, if an imaging apparatus is manufactured without taking the item b into consideration, a case of not satisfying the item b occurs. If an imaging apparatus is manufactured so as to satisfy the item b, object recognition performance is improved in this case compared with an imaging apparatus which is manufactured without taking the item b into consideration, and thus it is possible to reduce variations in the object recognition performance for each of imaging apparatuses.

In addition, in step 207, the screen/sound output unit 130 displays a frame with a predetermined color in an object with which it is determined that "collision" will occur on the reference image of the screen, and outputs a warning sound. Therefore, compared with a case of not satisfying the item b, the object recognition performance is improved, and thus it is possible to notify a user of the colliding object more rapidly and more reliably.

In addition, if there is an object with which it is determined that "collision" will occur on the reference image of the screen in step 208, the control unit generates a control signal for avoiding the collision and outputs to outside of the imaging apparatus. Therefore, compared with a case of not satisfying the item b, the object recognition performance is improved, and therefore it is possible to perform control for avoiding the object more rapidly and more reliably and thus to reduce a possibility of the collision.

Item 1-11: The transmittance of the optical element 101a is higher than that of the optical element 101b.

Item 1-12: The distortion coefficient of the lens in the radial direction of the optical element 101a is smaller than that of the optical element 101b.

Item 1-13: The distortion coefficient of the lens in the tangential direction of the optical element 101a is smaller than that of the optical element 101b.

Item 1-14: The dynamic range of the imaging element 103a is wider than that of the imaging element 103b.

Item 1-15: The luminance value of an image in uniform light of the imaging element 103a is greater than that of the imaging element 103b.

Item 1-16: The SN ratio of the imaging element 103a is smaller than that of the imaging element 103b.

Item 1-17: The standard deviation of luminance values of an image in uniform light of the imaging element 103a is smaller than that of the imaging element 103b.

Item 1-18: The level of shot noise of light with predetermined intensity of the imaging element 103a is lower than that of the imaging element 103b.

Item 1-19: The level of dark current noise of the imaging element 103a is lower than that of the imaging element 103b.

Item 1-20: The level of reading noise of the imaging element 103a is lower than that of the imaging element 103b.

Item 1-21: The level of fixed pattern noise with predetermined intensity of the imaging element 103a is lower than that of the imaging element 103b.

Item 1-22: The number of defective pixels of the imaging element 103a is lower than that of the imaging element 103b.

Item 1-23: The dynamic range of the imaging element 103a which receives light having passed through the optical element 101a is wider than that of the imaging element 103b which receives light having passed through the optical element 101b.

Item 1-24: The luminance value of an image in uniform light of the imaging element 103a which receives light having passed through the optical element 101a is greater than that of the imaging element 103b which receives light having passed through the optical element 101b.

Item 1-25: The SN ratio of the imaging element 103a which receives light having passed through the optical element 101a is smaller than that of the imaging element 103b which receives light having passed through the optical element 101b.

Item 1-26: The standard deviation of luminance values of an image in uniform light of the imaging element 103a which receives light having passed through the optical element 101a is smaller than that of the imaging element 103b which receives light having passed through the optical element. 101b.

Item 1-27: The level of shot noise of light with predetermined intensity of the imaging element 103a which receives light having passed through the optical element 101a is lower than that of the imaging element 103b which receives light having passed through the optical element 101b.

Item 1-28: The level of dark current noise of the imaging element 103a which receives light having passed through the optical element 101a is lower than that of the imaging element 103b which receives light having passed through the optical element 101b.

Item 1-29: The level of reading noise of the imaging element 103a which receives light having passed through the optical element 101a is lower than that of the imaging element 103b which receives light having passed through the optical element 101b.

Item 1-30: The level of fixed pattern noise of light with predetermined intensity of the imaging element 103a which receives light having passed through the optical element 101a is lower than that of the imaging element 103b which receives light having passed through the optical element 101b.

In operation procedures of the imaging apparatus according to the embodiment, of the present invention illustrated in FIG. 1, the characteristic input/output means 123 reads, from the characteristic storage means 104a and the characteristic storage means 104b, the information regarding transmittance, and distortion coefficients of the lenses in the radial direction and the tangential direction of the optical element. 101a and the optical element 101b; the information regarding dynamic ranges, luminance values of images obtained by imaging an object with uniform light, SN ratios, standard deviations (variations) of luminance values of images obtained by imaging an object with uniform light, shot noise of light with predetermined intensity, dark current noise, reading noise, fixed pattern noise of light with predetermined intensity, and the number of defective pixels of the imaging element 103a and the imaging element 103b; and dynamic ranges of the imaging element 103a and the imaging element 103b which receive light having passed through the optical element 101a and the optical element 101b, luminance values of images of the imaging element 103a and the imaging element 103b which receive light having passed through the optical element 101a and the optical element 101b when an object is imaged with uniform light, SN ratios of the imaging element 103a and the imaging element 103b which receive light having passed through the optical element 101a and the optical element 101b, standard deviations (variations) of luminance values of images of the imaging element 103a and the imaging element 103b which receive light having passed through the optical element 101a and the optical element 101b when an object is imaged with uniform light, shot noise of the imaging element 103a and the imaging element 103b which receive light having passed through the optical element 101a and the optical element 101b when light with predetermined intensity is incident, dark current noise of the imaging element 103a and the imaging element 103b which receive light having passed through the optical element 101a and the optical element 101b, reading noise of the imaging element 103a and the imaging element 103b which receive light having passed through the optical element 101a and the optical element 101b, fixed pattern noise of the imaging element 103a and the imaging element 103b which receive light having passed through the optical element 101a and the optical element 101b when light with predetermined intensity is incident, and the like, and outputs the information to outside of the imaging apparatus. Therefore, on the basis of the information values, it is possible to check whether or not one of the above-described items 1-11 to 1-30 is satisfied.

(Modification Example 1-2)

In step 204 of the operation procedures (FIG. 2) of the imaging apparatus according to the embodiment of the present invention illustrated in FIG. 1, also in a case where the disparity calculation means 120 calculates a value of an SAD, and searches for the smallest region on the comparison image so as to calculate disparity. Alternatively, the disparity calculation means may calculate a zero-mean sum of absolute differences (ZSAD), a sum of squared differences (SSD), a zero-mean sum of squared differences (ZSSD), normalized cross correlation (NCC), or zero-mean cross correlation (ZNCC) and searches for the smallest region on the comparison image so as to calculate disparity, it is possible to obtain the disparity.

(Modification Example 1-3)

In the imaging apparatus according to the embodiment of the present invention illustrated in FIG. 1, also in a case where the imaging element 103*a* and the imaging element 103*b* are respectively provided with imaging element characteristic storage means 105*a* and imaging element characteristic storage means 105*b* such as memories which store information regarding sensitivity characteristics, noise, the number of defective pixels, and the like of the imaging element 103*a* and the imaging element 103*b*; and in the operation procedures of the imaging apparatus according to the embodiment of the present invention illustrated in FIG. 1, the characteristic input/output means 123 reads the information regarding sensitivity characteristics, noise, the number of defective pixels, and the like of the imaging element 103*a* and the imaging element 103*b*, from the imaging element characteristic storage means 105*a* and the imaging element characteristic storage means 105*b*, and may output the information to outside of the imaging apparatus, on the basis of the information values, it is possible to check whether or not one of the items 1-3 to 1-5 is satisfied.

In addition, in operation procedures of the imaging apparatus according to the embodiment of the present invention illustrated in FIG. 1, also in a case where the characteristic input/output means 123 reads, from the imaging element characteristic storage means 105*a* and the imaging element characteristic storage means 105*b*, the information regarding dynamic ranges, luminance values of images obtained by imaging an object with uniform light, SN ratios, standard deviations (variations) of luminance values of images obtained by imaging an object with uniform light, shot noise of light with predetermined intensity, dark current noise, reading noise, fixed pattern noise of light with predetermined intensity, and the number of defective pixels of the imaging element 103*a* and the imaging element 103*b*, and outputs the information to outside of the imaging apparatus, on the basis of the information values, it is possible to check whether or not one of the above-described items 1-14 to 1-22 is satisfied.

(Modification Example 1-4)

In the imaging apparatus according to the embodiment of the present invention illustrated in FIG. 1, also in a case where the characteristic storage means 104*a* and the characteristic storage means 104*b* are provided not in the imaging unit 100*a* and the imaging unit 100*b* but in the calculation unit 110; and in operation procedures of the imaging apparatus according to the embodiment of the present invention illustrated in FIG. 1, the characteristic input/output means 123 reads the information regarding transmittance, distortions, and the like of the optical element 101*a* and the optical element 101*b*, the information regarding sensitivity characteristics, noise, the number of defective pixels, and the like of the imaging element 103*a* and the imaging element 103*b*, and the information regarding sensitivity characteristics, noise, and the like of the imaging unit 100*a* and the imaging unit 100*b*, stored in the characteristic storage means 104*a* and the characteristic storage means 104*b*, and outputs the information to outside of the imaging apparatus, on the basis of the information values, it is possible to check whether or not one of the above-described items 1-1 to 1-7 is satisfied.

In addition, in operation procedures of the imaging apparatus according to the embodiment of the present invention illustrated in FIG. 1, also in a case where the characteristic input/output means 123 reads, from the characteristic storage means 104*a* and the characteristic storage means 104*b*, the information regarding transmittance, and distortion coefficients of the lenses in the radial direction and the tangential direction of the optical element 101*a* and the optical element 101*b*; the information regarding dynamic ranges, luminance values of images obtained by imaging an object with uniform light, SN ratios, standard deviations (variations) of luminance values of images obtained by imaging an object with uniform light, shot noise of light with predetermined intensity, dark current noise, reading noise, fixed pattern noise of light with predetermined intensity, and the number of defective pixels of the imaging element 103*a* and the imaging element 103*b*; and dynamic ranges of the imaging element 103*a* and the imaging element 103*b* which receive light having passed through the optical element 101*a* and the optical element 101*b*, luminance values of images of the imaging element 103*a* and the imaging element 103*b* which receive light having passed through the optical element 101*a* and the optical element 101*b* when an object is imaged with uniform light, SN ratios of the imaging element 103*a* and the imaging element 103*b* which receive light having passed through the optical element 101*a* and the optical element 101*b*, standard deviations (variations) of luminance values of images of the imaging element 103*a* and the imaging element 103*b* which receive light having passed through the optical element 101*a* and the optical element 101*b* when an object is imaged with uniform light, shot noise of the imaging element 103*a* and the imaging element 103*b* which receive light having passed through the optical element 101*a* and the optical element 101*b* when light with predetermined intensity is incident, dark current noise of the imaging element 103*a* and the imaging element 103*b* which receive light having passed through the optical element 101*a* and the optical element 101*b*, reading noise of the imaging element 103*a* and the imaging element 103*b* which receive light having passed through the optical element 101*a* and the optical element 101*b*, fixed pattern noise of the imaging element 103*a* and the imaging element 103*b* which receive light having passed through the optical element 101*a* and the optical element 101*b* when light with predetermined intensity is incident, and the like, and outputs the information to outside of the imaging apparatus, on the basis of the information values, it is possible to check whether or not one of the above-described items 1-11 to 1-30 is satisfied.

(Modification Example 1-5)

In step 207 of the operation procedures (FIG. 2) of the imaging apparatus according to the embodiment of the present invention illustrated in FIG. 1, also in a case where the screen/sound output unit 130 displays the disparity image or the distance image instead of the reference image on the screen and display a frame with a predetermined color in an object with which it is determined that "collision" will occur, it is possible to notify a user of the colliding object.

(Modification Example 1-6)

In the imaging apparatus according to the embodiment of the present invention illustrated in FIG. 1, not only two imaging units but also three or more imaging units are provided, and the operation procedures illustrated in FIG. 2 are performed on a combination of two of the plurality of imaging units. Therefore, a distance to an object imaged by the plurality of imaging units or the object can be recognized, and, in the combination of the two of the plurality of imaging units, an imaging unit for a reference image includes an optical element or an imaging element satisfying one item a among the preset items 1-1 to 1-7.

For this reason, compared with a case of not satisfying the item a, quality of a reference image becomes higher than that of a comparison image, and an object recognition process is performed in step 206 by using the reference image with the higher quality, so that object recognition performance is improved.

In addition, if an imaging apparatus is manufactured without taking the item a into consideration, a case of not satisfying the item a occurs. If an imaging apparatus is manufactured so as to satisfy the item a, object recognition performance is improved in this case compared with an imaging apparatus which is manufactured without taking the item a into consideration, and thus it is possible to reduce variations in the object recognition performance for each of imaging apparatuses.

In addition, in step 207, the screen/sound output unit 130 displays a frame with a predetermined color in an object with which it is determined that "collision" will occur on the reference image of the screen, and outputs a warning sound. Therefore, compared with a case of not satisfying the item a, the object recognition performance is improved, and thus it is possible to notify a user of the colliding object more rapidly and more reliably.

In addition, in step S208, if there is an object with which it is determined that "collision" will occur on the reference image of the screen, the control unit generates a control signal for avoiding the collision and outputs to outside of the imaging apparatus. Therefore, compared with a case of not satisfying the item a, the object recognition performance is improved, and therefore it is possible to perform control for avoiding the object more rapidly and more reliably and thus to reduce a possibility of the collision.

Embodiment 2

FIG. 4 illustrates a configuration of an imaging apparatus according to another embodiment of the present invention.

The imaging apparatus according to the embodiment of the present invention includes an imaging unit 400a, an imaging unit 400b, a calculation unit 410, a screen/sound output unit 130, and a control unit 140. The screen/sound output unit 130 and the control unit 140 are the same as those illustrated in FIG. 1, and thus description thereof will be omitted.

The imaging unit 400a such as a camera includes an optical element 101a, shutter means 102a, and an imaging element 103a.

The optical element 101a, the shutter means 102a, and the imaging element 103a are the same as those illustrated in FIG. 1, and description thereof will be omitted.

The imaging unit 400b such as a camera includes an optical element 101b, shutter means 102b, and an imaging element 103b.

The optical element 101b, the shutter means 102b, and the imaging element 103b are the same as those illustrated in FIG. 1, and description thereof will be omitted.

The calculation unit 410 constituted by a central processing unit (CPU), a memory, and the like includes reference image storage means 111, comparison image storage means 112, processed image storage means 113, characteristic storage means 404, luminance correction information storage means 114, geometric rectification information storage means 115, synchronization signal transmission means 116, image acquisition means 417a, image acquisition means 417b, reference image selection means 424, luminance correction means 118, geometric rectification means 119, disparity calculation means 120, distance calculation means 121, recognition means 122, and characteristic input/output means 423.

The reference image storage means 111, the comparison image storage means 112, the processed image storage means 113, the luminance correction information storage means 114, the geometric rectification information storage means 115, the synchronization signal transmission means 116, the luminance correction means 118, the geometric rectification means 119, the disparity calculation means 120, the distance calculation means 121, and the recognition means 122 are the same as those illustrated in FIG. 1, and description thereof will be omitted.

The characteristic storage means 404 such as a memory and a hard disk stores information regarding transmittance, distortion, and the like of the optical element 101a and the optical element 101b, information regarding sensitivity characteristics, noise, the number of defective pixels, and the like of the imaging element 103a and the imaging element 103b, and information regarding sensitivity characteristics, noise, and the like of the imaging unit 400a and the imaging unit 400b. The information regarding distortion of the optical element 101a and the optical element 101b includes distortion coefficients of lenses in a radial direction, distortion coefficients of lenses in a tangential direction, and the like. The information regarding sensitivity characteristics of the imaging element 103a and the imaging element 103b includes dynamic ranges, luminance values of images obtained by imaging an object with uniform light, and the like. The information regarding noise of the imaging element 103a and the imaging element 103b includes SN ratios, standard deviations (variations) of luminance values of images obtained by imaging an object with uniform light, shot noise of light with predetermined intensity, dark current noise, reading noise, fixed pattern noise of light with predetermined intensity, and the like. The information regarding a sensitivity characteristic of the imaging unit 400a and the imaging unit 400b includes dynamic range of the imaging element 103a and the imaging element 103b which receive light having passed through the optical element 101a and the optical element 101b, luminance values of images of the imaging element 103a and the imaging element 103b which receive light having passed through the optical element 101a and the optical element 101b when an object is imaged with uniform light, and the like. The information regarding noise of the imaging unit 400a and the imaging unit 400b includes SN ratios of the imaging element 103a and the imaging element 103b which receive light having passed through the optical element 101a and the optical element 101b, standard deviations (variations) of luminance values of images of the imaging element 103a and the imaging element 103b which receive light having passed through the optical element 101a and the optical element 101b when an object is imaged with uniform light, shot noise of the imaging element 103a and the imaging element 103b which receive light having passed through the optical element 101a and the optical element 101b when light with predetermined intensity is incident, dark current noise of the imaging element 103a and the imaging element 103b which receive light having passed through the optical element 101a and the optical element 101b, reading noise of the imaging element 103a and the imaging element 103b which receive light having passed through the optical element 101a and the optical element 101b, fixed pattern noise of the imaging element 103a and the imaging element 103b which receive light having passed through the optical element 101a and the optical element 101b when light with predetermined intensity is incident, and the like.

The image acquisition means 417a sends a signal for opening the shutter to the shutter means 102a and acquires an image generated by the imaging element 103a, in synchronization with the synchronization signal from the synchronization signal transmission means 116.

The image acquisition means 417b sends a signal for opening the shutter to the shutter means 102b and acquires an image generated by the imaging element 103b, in synchronization with the synchronization signal from the synchronization signal transmission means 116.

The reference image selection means 424 reads, from the characteristic storage means 404, the information regarding transmittance, distortions, and the like of the optical element 101a and the optical element 101b, the information regarding sensitivity characteristics, noise, the number of defective pixels, and the like of the imaging element 103a and the imaging element 103b, and the information regarding sensitivity characteristics, noise, and the like of the imaging unit 400a and the imaging unit 400b. The image acquisition means 417a and the image acquisition means 417b respectively receive acquired images. An image of the optical element or the imaging element satisfying one item c among the following items 2-1 to 2-7 which are predetermined conditions set in advance is used as a reference image, and the other image is used as a comparison image. The reference image is stored in the reference image storage means 111, and the comparison image is stored in the comparison image storage means 112.

Item 2-1: The transmittance of the optical element is high.
Item 2-2: The distortion of the optical element is small.
Item 2-3: The sensitivity characteristic of the imaging element is high.
Item 2-4: The level of noise of the imaging element is low.
Item 2-5: The number of defective pixels of the imaging element is small.
Item 2-6: The sensitivity characteristic of the imaging unit is high.
Item 2-7: The level of noise of the imaging unit is low.

The characteristic input/output means 423 acquires the information regarding transmittance, distortion, and the like of the optical element 101a and the optical element 101b, the information regarding a sensitivity characteristic, noise, the number of defective pixels and the like of the imaging element 103a and the imaging element 103b, or the information regarding a sensitivity characteristic, noise, and the like of the imaging unit 400a and the imaging unit 400b, stored in the characteristic storage means 404, and outputs the information to outside of the imaging apparatus.

With reference to FIG. 5, a description will be made of operation procedures of the imaging apparatus according to the embodiment of the present invention illustrated in FIG. 4. Here, processes of steps 202 to 208 are the same as steps 202 to 208 of FIG. 2, and thus description thereof will be omitted.

Step 501: The reference image selection means 424 reads the information regarding transmittance, distortion, and the like of the optical element 101a and the optical element 101b, the information regarding a sensitivity characteristic, noise, the number of defective pixels and the like of the imaging element 103a and the imaging element 103b, or the information regarding a sensitivity characteristic, noise, and the like of the imaging unit 400a and the imaging unit 400b, from the characteristic storage means 404. The image acquisition means 417a and the image acquisition means 417b respectively receive acquired images. The imaging unit having the optical element or the imaging element satisfying one item c of the above-described preset items 2-1 to 2-7 is determined as an imaging unit for a reference image.

Step 502: The synchronization signal transmission means 116 generates a synchronization signal and sends the synchronization signal to the image acquisition means 417a and the image acquisition means 417b. The image acquisition means 417a sends a shutter opening/closing signal and exposure time information to the shutter means 102a right after receiving the synchronization signal from the synchronization signal transmission means 116. The shutter means 102a opens the shutter mechanism only for the exposure time right after receiving the shutter opening/closing signal and the exposure time information from the image acquisition means 417a, and then closes the shutter mechanism. The imaging element 103a receives an image of light refracted by the optical element 101a, generates an image corresponding to the intensity of the light, and sends the image to the image acquisition means 417a. The image acquisition means 417a receives the image from the imaging element 103a and sends the image to the reference image selection means 424.

The image acquisition means 417b sends a shutter opening/closing signal and exposure time information to the shutter means 102b right after receiving the synchronization signal from the synchronization signal transmission means 116. The shutter means 102b opens the shutter mechanism only for the exposure time right after receiving the shutter opening/closing signal and the exposure time information from the image acquisition means 417b, and then closes the shutter mechanism. The imaging element 103b receives an image of light refracted by the optical element 101b, generates an image corresponding to the intensity of the light, and sends the image to the image acquisition means 417b. The image acquisition means 417b receives the image from the imaging element 103b and sends the image to the reference image selection means 424.

Step 503: The reference image selection means 424 receives the images from the image acquisition means 417a and the image acquisition means 417b, respectively. The image of the imaging unit for a reference image, determined in step 501, is used as a reference image, and the other image is used as a comparison image. The reference image is stored in the reference image storage means 111, and the comparison image is stored in the comparison image storage means 112.

A description will be made of operation procedures of the imaging apparatus according to the embodiment of the present invention illustrated in FIG. 4.

The characteristic input/output means 423 reads, from the characteristic storage means 404, the information regarding transmittance and distortions (a distortion coefficient of a lens in a radial direction, a distortion coefficient of a lens in a tangential direction, and the like) of the optical element 101a and the optical element 101b; the information regarding sensitivity characteristics (a dynamic range, a luminance value of an image obtained by imaging an object with uniform light, and the like), noise (an SN ratio, a standard deviation (variation) of luminance values of an image obtained by imaging an object with uniform light, shot noise of light with predetermined intensity, dark current noise, reading noise, fixed pattern noise of light with predetermined intensity, and the like), the number of defective pixels, and the like of the imaging element 103a and the imaging element 103b; and the information regarding sensitivity characteristics (dynamic ranges of the imaging element 103a and the imaging element 103b which receive light having passed through the optical element 101a and the optical element 101b, luminance values of images of the imaging element 103a and the imaging element 103b which receive light having passed through the optical element 101a and the optical element 101b when an object is imaged with uniform light, and the like), noise (SN ratios of the imaging element 103a and the imaging element 103b which receive light having passed through the optical element 101a and the optical element 101b, standard deviations (variations) of luminance values of images of the imaging element 103a and the imaging element 103b which receive light having passed through the optical element 101a and the optical element 101b when an object is imaged with uniform light, shot noise of the imaging element 103a and the imaging element 103b which receive light having passed through the optical element 101a and the optical element 101b when light with predetermined intensity is incident, dark current noise of the imaging element 103a and the imaging element 103b which receive light having passed through the optical element 101a and the optical element 101b, reading noise of the imaging element 103a and the imaging element 103b which receive light having passed through the optical element 101a and the optical element 101b, fixed pattern noise of the imaging element 103a and the imaging element 103b which receive light having passed through the optical element 101a and the optical element 101b when light with predetermined intensity is incident, and the like), and the like of the imaging unit 400a and the imaging unit 400b, and outputs the information to the outside of the imaging apparatus.

According to the operation procedures (FIG. 5) of the imaging apparatus according to the embodiment of the present invention illustrated in FIG. 4, in step 501, the reference image selection means 424 sets the imaging unit having the optical element or the imaging element satisfying one item c of the above-described preset items 2-1 to 2-7 as an imaging unit for a reference image, and, in step 503, the reference image selection means 424 sets the image of the imaging unit for a reference image, set in step 501, as a reference image and sets the other image as a comparison image. Therefore, compared with a case of not satisfying the item c, quality of a reference image becomes higher than that of a comparison image, and an object recognition process is performed in step 206 by using the reference image with the higher quality, so that object recognition performance is improved.

In addition, if an imaging apparatus is manufactured without taking the item c into consideration, a case of not satisfying the item c occurs. If an imaging apparatus is manufactured so as to satisfy the item c, object recognition performance is improved in this case compared with an imaging apparatus which is manufactured without taking the item c into consideration, and thus it is possible to reduce variations in the object recognition performance for each of imaging apparatuses.

Further, in step 207, the screen/sound output unit 130 displays a frame with a predetermined color in an object with which it is determined that "collision" will occur on the reference image of the screen, and outputs a warning sound. Therefore, compared with a case of not satisfying the item c, the object recognition performance is improved, and thus it is possible to notify a user of the colliding object more rapidly and more reliably.

In addition, in step S208, if there is an object with which it is determined that "collision" will occur on the reference image of the screen, the control unit generates a control signal for avoiding the collision and outputs to outside of the imaging apparatus. Therefore, compared with a case of not satisfying the item c, the object recognition performance is improved, and therefore it is possible to perform control for avoiding the object more rapidly and more reliably and thus to reduce a possibility of the collision.

According to the operation procedures of the imaging apparatus of the embodiment of the present invention illustrated in FIG. 4, the characteristic input/output means 423 reads the information regarding transmittance, distortions, and the like of the optical element 101a and the optical element 101b, the information regarding sensitivity characteristics, noise, the number of defective pixels, and the like of the imaging element 103a and the imaging element 103b, and the information regarding sensitivity characteristics, noise, and the like of the imaging unit 400a and the imaging unit 400b, stored in the characteristic storage means 404, and outputs the information to outside of the imaging apparatus. Therefore, on the basis of the information values, it is possible to check whether or not one of the above-described items 2-1 to 2-7 is satisfied.

Further, the imaging apparatus of the present invention is not limited to the above-described embodiment, and may be applied through various modifications. Hereinafter, modification examples of the imaging apparatus of the present invention will be described.

(Modification Example 2-1)

In step 501 of the embodiment of the imaging apparatus of the present invention illustrated in FIG. 4, also in a case where the reference image selection means 424 sets the imaging unit having the optical element or the imaging element satisfying one item d among the following items 2-11 to 2-30 which are predetermined conditions set in advance, instead of the above-described preset items 2-1 to 2-7, as an imaging unit for a reference image, compared with a case of not satisfying the item d, quality of a reference image becomes higher than that of a comparison image, and an object recognition process is performed in step 206 by using the reference image with the higher quality, so that object recognition performance is improved.

In addition, if an imaging apparatus is manufactured without taking the item d into consideration, a case of not satisfying the item d occurs. If an imaging apparatus is manufactured so as to satisfy the item d, object recognition performance is improved in this case compared with an imaging apparatus which is manufactured without taking the item d into consideration, and thus it is possible to reduce variations in the object recognition performance for each of imaging apparatuses.

In addition, in step 207, the screen/sound output unit 130 displays a frame with a predetermined color in an object with which it is determined that "collision" will occur on the reference image of the screen, and outputs a warning sound. Therefore, compared with a case of not satisfying the item d, the object recognition performance is improved, and thus it is possible to notify a user of the colliding object more rapidly and more reliably.

In addition, in step S208, if there is an object with which it is determined that "collision" will occur on the reference image of the screen, the control unit generates a control signal for avoiding the collision and outputs to outside of the imaging apparatus. Therefore, compared with a case of not satisfying the item d, the object recognition performance is improved, and therefore it is possible to perform control for avoiding the object more rapidly and more reliably and thus to reduce a possibility of the collision.

Item 2-11: The transmittance of the optical element is high.
Item 2-12: The distortion coefficient of the lens in the radial direction of the optical element is small.
Item 2-13: The distortion coefficient of the lens in the tangential direction of the optical element is small.
Item 2-14: The dynamic range of the imaging element is wide.
Item 2-15: The luminance value of an image in uniform light of the imaging element is great.
Item 2-16: The SN ratio of the imaging element is small.
Item 2-17: The standard deviation of luminance values of an image in uniform light of the imaging element is small.
Item 2-18: The level of shot noise of light with predetermined intensity of the imaging element is low.
Item 2-19: The level of dark current noise of the imaging element is low.
Item 2-20: The level of reading noise of the imaging element is low.
Item 2-21: The level of fixed pattern noise with predetermined intensity of the imaging element is low.
Item 2-22: The number of defective pixels of the imaging element is low.
Item 2-23: The dynamic range of the imaging element which receives light having passed through the optical element is wide.
Item 2-24: The luminance value of an image in uniform light of the imaging element which receives light having passed through the optical element is great.
Item 2-25: The SN ratio of the imaging element which receives light having passed through the optical element is small.
Item 2-26: The standard deviation of luminance values of an image in uniform light of the imaging element which receives light having passed through the optical element is small.
Item 2-27: The level of shot noise of light with predetermined intensity of the imaging element which receives light having passed through the optical element is low.
Item 2-28: The level of dark current noise of the imaging element which receives light having passed through the optical element is low.
Item 2-29: The level of reading noise of the imaging element which receives light having passed through the optical element is low.
Item 2-30: The level of fixed pattern noise of light with predetermined intensity of the imaging element which receives light having passed through the optical element is low.

In operation procedures of the imaging apparatus according to the embodiment of the present invention illustrated in FIG. 4, the characteristic input/output means 423 reads, from the characteristic storage means 404, the information regarding transmittance, and distortion coefficients of the lenses in the radial direction and the tangential direction of the optical element 101a and the optical element 101b; the information regarding dynamic ranges, luminance values of images obtained by imaging an object with uniform light, SN ratios, standard deviations (variations) of luminance values of images obtained by imaging an object with uniform light, shot noise of light with predetermined intensity, dark current noise, reading noise, fixed pattern noise of light with predetermined intensity, and the number of defective pixels of the imaging element 103a and the imaging element 103b; and dynamic ranges of the imaging element 103a and the imaging element 103b which receive light having passed through the optical element 101a and the optical element 101b, luminance values of images of the imaging element 103a and the imaging element 103b which receive light having passed through the optical element 101a and the optical element 101b when an object is imaged with uniform light, SN ratios of the imaging element 103a and the imaging element 103b which receive light having passed through the optical element 101a and the optical element 101b, standard deviations (variations) of luminance values of images of the imaging element 103a and the imaging element 103b which receive light having passed through the optical element 101a and the optical element 101b when an object is imaged with uniform light, shot noise of the imaging element 103a and the imaging element 103b which receive light having passed through the optical element 101a and the optical element 101b when light with predetermined intensity is incident, dark current noise of the imaging element 103a and the imaging element 103b which receive light having passed through the optical element 101a and the optical element 101b, reading noise of the imaging element 103a and the imaging element 103b which receive light having passed through the optical element 101a and the optical element 101b, fixed pattern noise of the imaging element 103a and the imaging element 103b which receive light having passed through the optical element 101a and the optical element 101b when light with predetermined intensity is incident, and the like, and outputs the information to outside of the imaging apparatus. Therefore, on the basis of the information values, it is possible to check whether or not one of the above-described items 2-11 to 2-30 is satisfied.

(Modification Example 2-2)

In the imaging apparatus according to the embodiment of the present invention illustrated in FIG. 4, also in a case where the imaging element 103a and the imaging element 103b are respectively store information regarding sensitivity characteristics, noise, the number of defective pixels, and the like of the imaging element 103a and the imaging element 103b; and in the operation procedures of the imaging apparatus according to the embodiment of the present invention illustrated in FIG. 4, the characteristic input/output means 423 reads the information regarding sensitivity characteristics, noise, the number of defective pixels, and the like of the imaging element 103a and the imaging element 103b, from the imaging element 103a and the imaging element 103b, and may output the information to outside of the imaging apparatus, on the basis of the information values, it is possible to check whether or not one of the items 2-3 to 2-5 is satisfied.

In addition, in operation procedures of the imaging apparatus according to the embodiment of the present invention illustrated in FIG. 4, also in a case where the characteristic input/output means 423 reads, from the imaging element 103a and the imaging element 103b, the information regarding dynamic ranges, luminance values of images obtained by imaging an object with uniform light, SN ratios, standard deviations (variations) of luminance values of images obtained by imaging an object with uniform light, shot noise of light with predetermined intensity, dark current noise, reading noise, fixed pattern noise of light with predetermined intensity, and the number of defective pixels of the imaging element 103a and the imaging element 103b, and outputs the information to outside of the imaging apparatus, on the basis of the information values, it is possible to check whether or not one of the above-described items 2-14 to 2-22 is satisfied.

In addition, in step 501 of the operation procedures (FIG. 5) of the embodiment of the imaging apparatus of the present invention illustrated in FIG. 4, also in a case where the reference image selection means 424 sets the imaging unit having the imaging element satisfying one item c among the following items 2-3 to 2-5 which are predetermined conditions set in advance as an imaging unit for a reference image on the basis of the information regarding sensitivity characteristics, noise, the number of defective pixels, and the like of the imaging element 103*a* and the imaging element 103*b*, read from the imaging element 103*a* and the imaging element 103*b*, compared with a case of not satisfying the item c, quality of a reference image becomes higher than that of a comparison image, and an object recognition process is performed in step 206 by using the reference image with the higher quality, so that object recognition performance is improved. In addition, if an imaging apparatus is manufactured without taking the item c into consideration, a case of not satisfying the item c occurs. If an imaging apparatus is manufactured so as to satisfy the item c, object recognition performance is improved in this case compared with an imaging apparatus which is manufactured without taking the item c into consideration, and thus it is possible to reduce variations in the object recognition performance for each of imaging apparatuses.

In addition, in step 501 of the operation procedures (FIG. 5) of the imaging apparatus of the embodiment of the present invention illustrated in FIG. 4, also in a case where the reference image selection means 424 sets the imaging unit having the imaging element satisfying one item d among the above-described items 2-14 to 2-22 set in advance as an imaging unit for a reference image on the basis of the information regarding dynamic ranges, luminance values of images obtained by imaging an object with uniform light, SN ratios, standard deviations (variations) of luminance values of images obtained by imaging an object with uniform light, shot noise of light with predetermined intensity, dark current noise, reading noise, fixed pattern noise of light with predetermined intensity, and the number of defective pixels of the imaging element 103*a* and the imaging element 103*b*, read from the imaging element 103*a* and the imaging element 103*b*, compared with a case of not satisfying the item d, quality of a reference image becomes higher than that of a comparison image, and an object recognition process is performed in step 206 by using the reference image with the higher quality, so that object recognition performance is improved. In addition, if an imaging apparatus is manufactured without taking the item d into consideration, a case of not satisfying the item d occurs. If an imaging apparatus is manufactured so as to satisfy the item d, object recognition performance is improved in this case compared with an imaging apparatus which is manufactured without taking the item d into consideration, and thus it is possible to reduce variations in the object recognition performance for each of imaging apparatuses.

(Modification Example 2-3)

In the imaging apparatus according to the embodiment of the present invention illustrated in FIG. 4, in a case where the characteristic storage means 104*a* and the characteristic storage means 104*b* are respectively provided in the imaging unit 400*a* and the imaging unit 400*b* instead of the characteristic storage means 404 of the calculation unit 410; and, in operation procedures of the imaging apparatus according to the embodiment of the present invention illustrated in FIG. 4, the characteristic input/output means 423 reads, from the characteristic storage means 104*a* and 104*b*, the information regarding transmittance, distortions, and the like of the optical element 101*a* and the optical element 101*b*, the information regarding sensitivity characteristics, noise, the number of defective pixels, and the like of the imaging element 103*a* and the imaging element 103*b*, and the information regarding sensitivity characteristics, noise, and the like of the imaging unit 400*a* and the imaging unit 400*b*, stored in the characteristic storage means 104*a* and the characteristic storage means 104*b*, and outputs the information to outside of the imaging apparatus, on the basis of the information values, it is possible to check whether or not one of the above-described items 2-1 to 2-7 is satisfied.

In addition, in operation procedures of the imaging apparatus according to the embodiment of the present invention illustrated in FIG. 4, also in a case where the characteristic input/output means 423 reads, from the characteristic storage means 104*a* and 104*b*, the information regarding transmittance, and distortion coefficients of the lenses in the radial direction and the tangential direction of the optical element 101*a* and the optical element 101*b*; the information regarding dynamic ranges, luminance values of images obtained by imaging an object with uniform light, SN ratios, standard deviations (variations) of luminance values of images obtained by imaging an object with uniform light, shot noise of light with predetermined intensity, dark current noise, reading noise, fixed pattern noise of light with predetermined intensity, and the number of defective pixels of the imaging element 103*a* and the imaging element 103*b*; and dynamic ranges of the imaging element 103*a* and the imaging element 103*b* which receive light having passed through the optical element 101*a* and the optical element 101*b*, luminance values of images of the imaging element 103*a* and the imaging element 103*b* which receive light having passed through the optical element 101*a* and the optical element 101*b* when an object is imaged with uniform light, SN ratios of the imaging element 103*a* and the imaging element 103*b* which receive light having passed through the optical element 101*a* and the optical element 101*b*, standard deviations (variations) of luminance values of images of the imaging element 103*a* and the imaging element 103*b* which receive light having passed through the optical element 101*a* and the optical element 101*b* when an object is imaged with uniform light, shot noise of the imaging element 103*a* and the imaging element 103*b* which receive light having passed through the optical element 101*a* and the optical element 101*b* when light with predetermined intensity is incident, dark current noise of the imaging element 103*a* and the imaging element 103*b* which receive light having passed through the optical element 101*a* and the optical element 101*b*, reading noise of the imaging element 103*a* and the imaging element 103*b* which receive light having passed through the optical element 101*a* and the optical element 101*b*, fixed pattern noise of the imaging element 103*a* and the imaging element 103*b* which receive light having passed through the optical element 101*a* and the optical element 101*b* when light with predetermined intensity is incident, and the like, and outputs the information to outside of the imaging apparatus, on the basis of the information values, it is possible to check whether or not one of the above-described items 2-1 to 2-30 is satisfied.

In addition, in step 501 of the operation procedures (FIG. 5) of the imaging apparatus of the embodiment of the present invention illustrated in FIG. 4, also in a case where the reference image selection means 424 sets the imaging unit having the imaging element satisfying one item c among the following items 2-1 to 2-7 set in advance as an imaging unit for a reference image on the basis of the information regarding transmittance, distortions, and the like of the optical element 101*a* and the optical element 101*b*, the information regarding sensitivity characteristics, noise, the number of defective pixels, and the like of the imaging element 103*a* and the imaging element 103*b*, and the information regarding sensitivity characteristics, noise, and the like of the imaging unit 400*a* and the imaging unit 400*b*, read from the characteristic storage means 104*a* and the characteristic storage means 104*b*, compared with a case of not satisfying the item c, quality of a reference image becomes higher than that of a comparison image, and an object recognition process is performed in step 206 by using the reference image with the higher quality, so that object recognition performance is improved. In addition, if an imaging apparatus is manufactured without taking the item c into consideration, a case of not satisfying the item c occurs. If an imaging apparatus is manufactured so as to satisfy the item c, object recognition performance is improved in this case compared with an imaging apparatus which is manufactured without taking the item c into consideration, and thus it is possible to reduce variations in the object recognition performance for each of imaging apparatuses.

In addition, in step 501 of the operation procedures (FIG. 5) of the imaging apparatus of the embodiment of the present invention illustrated in FIG. 4, also in a case where the reference image selection means 424 sets the imaging unit having the imaging element satisfying one item d among the above-described items 2-11 to 2-30 set in advance as an imaging unit for a reference image on the basis of the information regarding transmittance, and distortion coefficients of the lenses in the radial direction and the tangential direction of the optical element 101*a* and the optical element 101*b*; the information regarding dynamic ranges, luminance values of images obtained by imaging an object with uniform light, SN ratios, standard deviations (variations) of luminance values of images obtained by imaging an object with uniform light, shot noise of light with predetermined intensity, dark current noise, reading noise, fixed pattern noise of light with predetermined intensity, and the number of defective pixels of the imaging element 103*a* and the imaging element 103*b*; and dynamic ranges of the imaging element 103*a* and the imaging element 103*b* which receive light having passed through the optical element 101*a* and the optical element 101*b*, luminance values of images of the imaging element 103*a* and the imaging element 103*b* which receive light having passed through the optical element 101*a* and the optical element 101*b* when an object is imaged with uniform light, SN ratios of the imaging element 103*a* and the imaging element 103*b* which receive light having passed through the optical element 101*a* and the optical element 101*b*, standard deviations (variations) of luminance values of images of the imaging element 103*a* and the imaging element 103*b* which receive light having passed through the optical element 101*a* and the optical element 101*b* when an object is imaged with uniform light, shot noise of the imaging element 103*a* and the imaging element 103*b* which receive light having passed through the optical element 101*a* and the optical element 101*b* when light with predetermined intensity is incident, dark current noise of the imaging element 103*a* and the imaging element 103*b* which receive light having passed through the optical element 101*a* and the optical element 101*b*, reading noise of the imaging element 103*a* and the imaging element 103*b* which receive light having passed through the optical element 101*a* and the optical element 101*b*, fixed pattern noise of the imaging element 103*a* and the imaging element 103*b* which receive light having passed through the optical element 101*a* and the optical element 101*b* when light with predetermined intensity is incident, and the like, read from the imaging element 103*a* and the imaging element 103*b*, compared with a case of not satisfying the item d, quality of a reference image becomes higher than that of a comparison image, and an object recognition process is performed in step 206 by using the reference image with the higher quality, so that object recognition performance is improved. In addition, if an imaging apparatus is manufactured without taking the item d into consideration, a case of not satisfying the item d occurs. If an imaging apparatus is manufactured so as to satisfy the item d, object recognition performance is improved in this case compared with an imaging apparatus which is manufactured without taking the item d into consideration, and thus it is possible to reduce variations in the object recognition performance for each of imaging apparatuses.

(Modification Example 2-4)

In step 501 of the imaging apparatus according to the embodiment of the present invention illustrated in FIG. 4, the reference image selection means 424 sends a signal indicating that "an image is acquired when the shutter means is closed", to the image acquisition means 417*a* and the image acquisition means 417*b*. Right after receiving the synchronization signal from the synchronization signal transmission means 116, the image acquisition means 417*a* receives an image of light refracted by the optical element 101*a* in a state in which the shutter mechanism of the shutter means 102*a* is closed, so as to generate an image corresponding to the intensity of the light, and sends the image to the image acquisition means 417*a*. The image acquisition means 417*a* receives the image from the imaging element 103*a* and sends the image to the reference image selection means 424. Right after receiving the synchronization signal from the synchronization signal transmission means 116, the image acquisition means 417*b* receives an image of light refracted by the optical element 101*b* in a state in which the shutter mechanism of the shutter means 102*b* is closed, so as to generate an image corresponding to the intensity of the light, and sends the image to the image acquisition means 417*b*. The image acquisition means 417*b* receives the image from the imaging element 103*b* and sends the image to the reference image selection means 424. The reference image selection means 424 receives the images from the image acquisition means 417*a* and the image acquisition means 417*b*, respectively. In a case where a luminance value of each pixel of each image is equal to or greater than a threshold value, it is determined that the pixel is a defective pixel, and the number of defective pixels is detected for each image. In a case where an imaging unit generating an image having the smaller number of defective pixels is used as the imaging unit for a reference image, even if the number of defective pixels increases due to deterioration over time in the imaging element, the imaging unit for a reference image is determined on the basis of a real image, and thus an image having a small number of defective pixels can be correctly set as a reference image. Therefore, it is possible to prevent deterioration in recognition performance using a reference image.

In addition, if an imaging apparatus is manufactured without taking into consideration the item d which leads to a small number of defective pixels, a case of not satisfying the item d occurs. If an imaging apparatus is manufactured so as to satisfy the item d, object recognition performance is improved in this case compared with an imaging apparatus which is manufactured without taking the item d into consideration, and thus it is possible to reduce variations in the object recognition performance for each of imaging apparatuses. In addition, in step 207, the screen/sound output unit 130 displays a frame with a predetermined color in an object with which it is determined that "collision" will occur on the reference image of the screen, and outputs a warning sound. Therefore, compared with a case of not satisfying the item d, the object recognition performance is improved, and thus it is possible to notify a user of the colliding object more rapidly and more reliably. In addition, if there is an object with which it is determined that "collision" will occur on the reference image of the screen in step 208, the control unit generates a control signal for avoiding the collision and outputs to outside of the imaging apparatus. Therefore, compared with a case of not satisfying the item d, the object recognition performance is improved, and therefore it is possible to perform control for avoiding the object more rapidly and more reliably and thus to reduce a possibility of the collision.

(Modification Example 2-5)

In the operation procedures of the imaging apparatus according to the embodiment of the present invention illustrated in FIG. 4, steps 601 and 602 are added thereto as illustrated in FIG. 6. Hereinafter, steps 601 and 602 will be described.

Step 601: If an imaging unit for a reference image is re-determined in step 602, the flow proceeds to step 503. If an imaging unit for a reference image is not re-determined, the flow proceeds to step 602.

Step 602: The reference image selection means 424 receives the images from the image acquisition means 417a and the image acquisition means 417b. Each of the images is divided into a plurality of regions. A mean of luminance values of each region of each image is calculated, and if a region having the greatest luminance mean and a region having the smallest luminance mean of each image are the same in the two images, the following determination is performed. An image in which a luminance mean difference between the region having the greatest luminance mean and the region having the smallest luminance mean in each image is larger is determined as being an image in which a dynamic range of the imaging element which receives light having passed through the optical element is wide. The imaging unit related to the image determined as being an image in which a dynamic range of the imaging element which receives light having passed through the optical element is wide is set as an imaging unit for a reference image.

As illustrated in step 602, in a case where the imaging unit for a reference image is set, even if a dynamic range of the imaging element which receives light having passed through the optical element changes due to deterioration over time in the imaging element, the imaging unit for a reference image is determined on the basis of a real image, and thus an image in which a dynamic range of the imaging element which receives light having passed through the optical element is wide can be correctly set as a reference image. Therefore, it is possible to prevent deterioration in recognition performance using a reference image.

In addition, if an imaging apparatus is manufactured without taking into consideration the item d which leads to a wide dynamic range of an imaging element which receives light having passed through an optical element, a case of not satisfying the item d occurs. If an imaging apparatus is manufactured so as to satisfy the item d, object recognition performance is improved in this case compared with an imaging apparatus which is manufactured without taking the item d into consideration, and thus it is possible to reduce variations in the object recognition performance for each of imaging apparatuses.

In addition, in step 207, the screen/sound output unit 130 displays a frame with a predetermined color in an object with which it is determined that "collision" will occur on the reference image of the screen, and outputs a warning sound. Therefore, compared with a case of not satisfying the item d, the object recognition performance is improved, and thus it is possible to notify a user of the colliding object more rapidly and more reliably.

In addition, if there is an object with which it is determined that "collision" will occur on the reference image of the screen in step 208, the control unit generates a control signal for avoiding the collision and outputs to outside of the imaging apparatus. Therefore, compared with a case of not satisfying the item d, the object recognition performance is improved, and therefore it is possible to perform control for avoiding the object more rapidly and more reliably and thus to reduce a possibility of the collision.

(Modification Example 2-6)

In the operation procedures of the imaging apparatus according to the embodiment of the present invention illustrated in FIG. 4, steps 601 and 602 are added thereto as illustrated in FIG. 6. Hereinafter, steps 601 and 602 will be described.

Step 601: If an imaging unit for a reference image is re-determined in step 602, the flow proceeds to step 503. If an imaging unit for a reference image is not re-determined, the flow proceeds to step 602.

Step 602: The reference image selection means 424 receives the images from the image acquisition means 417a and the image acquisition means 417b. Each of the images is divided into a plurality of regions. If regions having the highest luminance in the respective images are the same in the two images, a mean and a standard deviation of luminance values of the region in each image are calculated, and if these values are all within threshold values, it is determined that uniform light is incident to the region, and the following process is performed. An image in which the mean of luminance values of the region is greater is determined as being an image in which a luminance value an image in uniform light of the imaging element which receives light having passed through the optical element is great. The imaging unit related to the image determined as being an image in which a luminance value an image in uniform light of the imaging element which receives light having passed through the optical element is great is set as an imaging unit for a reference image.

As illustrated in step 602, in a case where the imaging unit for a reference image is set, even if a luminance value of an image in uniform light of the imaging element which receives light having passed through the optical element changes due to deterioration over time in the imaging element, the imaging unit for a reference image is determined on the basis of a real image, and thus an image in which a luminance value an image in uniform light of the imaging element which receives light having passed through the optical element is great can be correctly set as a reference image. Therefore, it is possible to prevent deterioration in recognition performance using a reference image.

In addition, if an imaging apparatus is manufactured without taking into consideration the item d which leads to a great luminance value of an image in uniform light of an imaging element which receives light having passed through an optical element, a case of not satisfying the item d occurs. If an imaging apparatus is manufactured so as to satisfy the item d, object recognition performance is improved in this case compared with an imaging apparatus which is manufactured without taking the item d into consideration, and thus it is possible to reduce variations in the object recognition performance for each of imaging apparatuses.

Further, in step 207, the screen/sound output unit 130 displays a frame with a predetermined color in an object with which it is determined that "collision" will occur on the reference image of the screen, and outputs a warning sound. Therefore, compared with a case of not satisfying the item d, the object recognition performance is improved, and thus it is possible to notify a user of the colliding object more rapidly and more reliably.

In addition, if there is an object with which it is determined that "collision" will occur on the reference image of the screen in step 208, the control unit generates a control signal for avoiding the collision and outputs to outside of the imaging apparatus. Therefore, compared with a case of not satisfying the item d, the object recognition performance is improved, and therefore it is possible to perform control for avoiding the object more rapidly and more reliably and thus to reduce a possibility of the collision.

(Modification Example 2-7)

In the operation procedures of the imaging apparatus according to the embodiment of the present invention illustrated in FIG. 4, steps 601 and 602 are added thereto as illustrated in FIG. 6. Hereinafter, steps 601 and 602 will be described.

Step 601: If an imaging unit for a reference image is re-determined in step 602, the flow proceeds to step 503. If an imaging unit for a reference image is not re-determined, the flow proceeds to step 602.

Step 602: The reference image selection means 424 receives the images from the image acquisition means 417a and the image acquisition means 417b. Each of the images is divided into a plurality of regions. If regions having the highest luminance in the respective images are the same in the two images, a mean and a standard deviation of luminance values of the region in each image are calculated, and if these values are all within threshold values, it is determined that uniform light is incident to the region, and the following determination is performed. An image in which the standard deviation of luminance values of the region is smaller is determined as being an image in which a standard deviation of luminance values of an image in uniform light of the imaging element which receives light having passed through the optical element is small. The imaging unit related to an image in which a standard deviation of luminance values of an image in uniform light of the imaging element which receives light having passed through the optical element is small is set as an imaging unit for a reference image.

As illustrated in step 602, in a case where the imaging unit for a reference image is set, even if a standard deviation of luminance values of an image in uniform light of the imaging element which receives light having passed through the optical element changes due to deterioration over time in the imaging element, the imaging unit for a reference image is determined on the basis of a real image, and thus an image in which a standard deviation of luminance values of an image in uniform light of the imaging element which receives light having passed through the optical element is small can be correctly set as a reference image. Therefore, it is possible to prevent deterioration in recognition performance using a reference image.

In addition, if an imaging apparatus is manufactured without taking into consideration the item d which leads to a small standard deviation of luminance values of an image in uniform light of an imaging element which receives light having passed through an optical element, a case of not satisfying the item d occurs. If an imaging apparatus is manufactured so as to satisfy the item d, object recognition performance is improved in this case compared with an imaging apparatus which is manufactured without taking the item d into consideration, and thus it is possible to reduce variations in the object recognition performance for each of imaging apparatuses.

In addition, in step 207, the screen/sound output unit 130 displays a frame with a predetermined color in an object with which it is determined that "collision" will occur on the reference image of the screen, and outputs a warning sound. Therefore, compared with a case of not satisfying the item d, the object recognition performance is improved, and thus it is possible to notify a user of the colliding object more rapidly and more reliably.

In addition, if there is an object with which it is determined that "collision" will occur on the reference image of the screen in step 208, the control unit generates a control signal for avoiding the collision and outputs to outside of the imaging apparatus. Therefore, compared with a case of not satisfying the item d, the object recognition performance is improved, and therefore it is possible to perform control for avoiding the object more rapidly and more reliably and thus to reduce a possibility of the collision.

(Modification Example 2-7)

In the imaging apparatus according to the embodiment of the present invention illustrated in FIG. 1, not only two imaging units but also three or more imaging units are provided, and the operation procedures illustrated in FIG. 5 or 6 are performed on a combination of two of the plurality of imaging units.

Therefore, a distance to an object imaged by the plurality of imaging units or the object can be recognized, and, in the combination of the two of the plurality of imaging units, in step 501, the reference image selection means 424 sets the imaging unit having the optical element or the imaging element satisfying one item c of the above-described preset items 2-1 to 2-7 as an imaging unit for a reference image, and, in step 503, the reference image selection means 424 sets the image of the imaging unit for a reference image, set in step 501, as a reference image and sets the other image as a comparison image. Therefore, compared with a case of not satisfying the item c, quality of a reference image becomes higher than that of a comparison image, and an object recognition process is performed in step 206 by using the reference image with the higher quality, so that object recognition performance is improved.

In addition, if an imaging apparatus is manufactured without taking the item c into consideration, a case of not satisfying the item c occurs. If an imaging apparatus is manufactured so as to satisfy the item c, object recognition performance is improved in this case compared with an imaging apparatus which is manufactured without taking the item c into consideration, and thus it is possible to reduce variations in the object recognition performance for each of imaging apparatuses.

In addition, in step 207, the screen/sound output unit 130 displays a frame with a predetermined color in an object with which it is determined that "collision" will occur on the reference image of the screen, and outputs a warning sound. Therefore, compared with a case of not satisfying the item c, the object recognition performance is improved, and thus it is possible to notify a user of the colliding object more rapidly and more reliably.

In addition, in step S208, if there is an object with which it is determined that "collision" will occur on the reference image of the screen, the control unit generates a control signal for avoiding the collision and outputs to outside of the imaging apparatus. Therefore, compared with a case of not satisfying the item c, the object recognition performance is improved, and therefore it is possible to perform control for avoiding the object more rapidly and more reliably and thus to reduce a possibility of the collision.

REFERENCE SIGNS LIST

100a IMAGING UNIT
100b IMAGING UNIT
101a OPTICAL ELEMENT
101b OPTICAL ELEMENT
102a SHUTTER MEANS
102b SHUTTER MEANS
103a IMAGING ELEMENT
103b IMAGING ELEMENT
104a CHARACTERISTIC STORAGE MEANS
104b CHARACTERISTIC STORAGE. MEANS
110 CALCULATION UNIT
111 REFERENCE IMAGE STORAGE MEANS
112 COMPARISON IMAGE STORAGE MEANS
113 PROCESSED IMAGE STORAGE MEANS
114 LUMINANCE CORRECTION INFORMATION STORAGE MEANS
115 GEOMETRIC RECTIFICATION INFORMATION STORAGE MEANS
116 SYNCHRONIZATION SIGNAL TRANSMISSION MEANS
117a REFERENCE IMAGE ACQUISITION MEANS
117b COMPARISON IMAGE ACQUISITION MEANS
118 LUMINANCE CORRECTION MEANS
119 GEOMETRIC RECTIFICATION MEANS
120 DISPARITY CALCULATION MEANS
121 DISTANCE CALCULATION MEANS
122 RECOGNITION MEANS
130 SCREEN/SOUND OUTPUT UNIT
140 CONTROL UNIT
301 REFERENCE IMAGE
302 COMPARISON IMAGE
400a IMAGING UNIT
400b IMAGING UNIT
404 CHARACTERISTIC STORAGE MEANS

The invention claimed is:
1. An imaging apparatus comprising:
a first optical element;
a first imaging element that receives light having passed through the first optical element, and outputs a first image which has a luminance value corresponding to intensity of the light;
a second optical element;
a second imaging element that receives light having passed through the second optical element, and outputs a second image which has a luminance value corresponding to intensity of the light;
a first shutter for causing light having passed through the first optical element to pass therethrough only for a first predetermined exposure time; and
a second shutter for causing light having passed through the second optical element to pass therethrough only for a second predetermined exposure time,
a processor configured to:
perform a selection process, wherein the selection process includes:
controlling the first shutter and the second shutter to close,
obtaining a first control image from the first imaging element and a second control image from the second imaging element when the first shutter and the second shutter are closed,
calculating a number of defective pixels in the first control image and the second control image, wherein a respective pixel is a defective pixel when a luminance value of the respective pixel is equal to or greater than a threshold,
selecting either the first imaging element or the second imagining element as a reference source based on the number of defective pixels calculated, wherein the reference source has a lowest number of defective pixels calculated, and
selecting either the first imaging element or the second imagining element as a comparison source based on the number of defective pixels calculated, wherein the comparison source has a highest number of defective pixels calculated;
obtain a reference image from the reference source;
obtain a comparison image from the comparison source;
extract a first region from the reference image,
search a second region on the comparison image, where the second region corresponds to the first region,
obtain disparity between the first region and the second region,
obtain a distance image from the disparity,
recognize an object based on distance image obtained.
2. The imaging apparatus according to claim 1,
wherein the first optical element and the second optical element, or the first imaging element and the second imaging element satisfy at least one second condition selected from the group consisting of:
transmittance of the first optical element is higher than transmittance of the second optical element,
a distortion coefficient of a lens in a radial direction of the first optical element is smaller than distortion coefficient of a lens in a radial direction of the second optical element,
a distortion coefficient of a lens in a tangential direction of the first optical element is smaller than distortion coefficient of a lens in a tangential direction of the second optical element,
a dynamic range of the first imaging element is wider than a dynamic range of the second imaging element,
a luminance value of the first image in uniform light of the first imaging element is greater than a luminance value of the second image in uniform light of the second imaging element,
an SN ratio of the first imaging element is smaller than an SN ratio of the second imaging element,
a standard deviation of luminance values of the first image in uniform light of the first imaging element is smaller than a standard deviation of luminance values of the second image in uniform light of the second imaging element,
the number of defective pixels of the first imaging element is smaller than the number of defective pixels of the second imaging element,
a dynamic range of the first imaging element which receives light having passed through the first optical element is wider than a dynamic range of the second imaging element which receives light having passed through the second optical element; a luminance value of the first image in uniform light of the first imaging element which receives light having passed through the first optical element is greater than a luminance value of the second image in uniform light of the second imaging element which receives light having passed through the second optical element, an SN ratio of the first imaging element which receives light having passed through the first optical element is smaller than an SN ratio of the second imaging element which receives light having passed through the second optical element, and standard deviation of luminance values of the first image in uniform light of the first imaging element which receives light having passed through the first optical element is smaller than a standard deviation of luminance values of the second image in uniform light of the second imaging element which receives light having passed through the second optical element.

3. The imaging apparatus according to claim 1, further comprising:
characteristic storage memory that stores at least one of:
transmittance,
distortions of the first optical element and the second optical element,
the number of defective pixels of the first imaging element and the second imaging element, and
levels of noise of the first imaging element which receives light having passed through the first optical element and the second imaging element which receives light having passed through the second optical element.

4. The imaging apparatus according to claim 3,
wherein the characteristic storage memory further stores at least one of:
transmittance of the first optical element and the second optical element,
distortion coefficients in a radial direction of the first optical element,
distortion coefficients in the radial direction of the second optical element,
distortion coefficients in a tangential direction of the first optical element,
distortion coefficients in the tangential direction of the second optical element,
the dynamic ranges of the first imaging element and the second imaging element,
the luminance values of images in uniform light of the first imaging element and the second imaging element,
the SN ratios of the first imaging element and the second imaging element,
the standard deviations of luminance values of images in uniform light of the first imaging element and the second imaging element,
the number of defective pixels of the first imaging element and the second imaging element,
the dynamic ranges of the first imaging element which receives light having passed through the first optical element and the second imaging element which receives light having passed through the second optical element,
the luminance values of images in uniform light of the first imaging element which receives light having passed through the first optical element and the second imaging element which receives light having passed through the second optical element,
the SN ratios of the first imaging element which receives light having passed through the first optical element and the second imaging element which receives light having passed through the second optical element, and standard deviations of luminance values of the first image in uniform light of the first imaging element which receives light having passed through the first optical element and the second imaging element which receives light having passed through the second optical element.

5. The imaging apparatus according to claim 1,
wherein the first imaging element stores at least one of sensitivity characteristic of the first imaging element, level of noise of the first imaging element, and the number of defective pixels of the first imaging element, and
wherein the second imaging element stores at least one of sensitivity characteristic of the second imaging element, level of noise of the second imaging element, and the number of defective pixels of the second imaging element.

6. The imaging apparatus according to claim 1,
wherein the first imaging element stores at least one of a dynamic range of the first imaging element, a luminance value of the first image in uniform light of the first imaging element, an SN ratio of the first imaging element, a standard deviation of luminance values of the first image in uniform light of the first imaging element, and the number of defective pixels of the first imaging element, and
wherein the second imaging element stores at least one of a dynamic range of the second imaging element, a luminance value of the second image in uniform light of the second imaging element, an SN ratio of the second imaging element, a standard deviation of luminance values of the second image in uniform light of the second imaging element, and the number of defective pixels of the second imaging element.

7. The imaging apparatus according to claim 1, wherein the first optical element and the second optical element, or the first imaging element and the second imaging element satisfy at least one condition selected from the group consisting of:
transmittance of the first optical element is higher than transmittance of the second optical element,
a distortion of the first optical element is smaller than a distortion of the second optical element,
a sensitivity characteristic of the first imaging element is higher than a sensitivity characteristic of the second imaging element,
a level of noise of the first imaging element is lower than a level of noise of the second imaging element,
a sensitivity characteristic of the first imaging element which receives light having passed through the first optical element is higher than a sensitivity characteristic of the second imaging element which receives light having passed through the second optical element, and
a level of noise of the first imaging element which receives light having passed through the first optical element is lower than a level of noise of the second imaging element which receives light having passed through the second optical element.

8. An imaging apparatus comprising:
a first optical element;
a first imaging element that receives light having passed through the first optical element, and outputs a first image which has a luminance value corresponding to intensity of the light;
a second optical element;

a second imaging element that receives light having passed through the second optical element, and outputs a second image which has a luminance value corresponding to intensity of the light;
a processor configured to:
perform a selection process, wherein the selection process includes:
dividing each of the first image and the second image into a plurality of regions,
calculating a dynamic range of the first imaging element and the second imaging element based on the plurality of regions, wherein the dynamic range is a difference in mean luminance value between a region having a highest mean luminance value and a lowest mean luminance value,
selecting either the first imaging element or the second imagining element as a reference source based on the dynamic range calculated, wherein the reference source has a highest dynamic range calculated, and
selecting either the first imaging element or the second imagining element as a comparison source based on the dynamic range calculated, wherein the comparison source has a lowest dynamic range calculated;
obtain a reference image from the reference source;
obtain a comparison image from the comparison source;
extract a first region from the reference image,
search a second region on the comparison image, where the second region corresponds to the first region,
obtain disparity between the first region and the second region, and
obtain a distance image from the disparity, and
recognize an object based on distance image obtained.

9. The imaging apparatus according to claim 8, further comprising:
characteristic storage memory that stores characteristic information relating to at least one of transmittance, distortions of the first optical element and the second optical element, sensitivity characteristics, levels of noise, and a number of defective pixels of the first imaging element and the second imaging element, and sensitivity characteristics and the levels of noise of the first imaging element which receives light having passed through the first optical element and the second imaging element which receives light having passed through the second optical element.

10. The imaging apparatus according to claim 9, wherein the characteristic storage memory further stores at least one of:
transmittance of the first optical element and the second optical element;
distortion coefficients in a radial direction of the first optical element;
distortion coefficients in a radial direction of the second optical element;
distortion coefficients in a tangential direction of the first optical element;
distortion coefficients in tangential direction of the second optical element;
the dynamic range of the first imaging element and the second imaging element;
luminance values of images in uniform light of the first imaging element and the second imaging element;
SN ratios of the first imaging element and the second imaging element; standard deviations of luminance values of images in uniform light of the first imaging element and the second imaging element;
a number of defective pixels of the first imaging element and the second imaging element;
SN ratios of the first imaging element which receives light having passed through the first optical element and the second imaging element which receives light having passed through the second optical element; and
standard deviations of luminance values of images in uniform light of the first imaging element which receives light having passed through the first optical element and the second imaging element which receives light having passed through the second optical element.

11. An imaging apparatus comprising:
a first optical element;
a first imaging element that receives light having passed through the first optical element, and outputs a first image which has a luminance value corresponding to intensity of the light;
a second optical element;
a second imaging element that receives light having passed through the second optical element, and outputs a second image which has a luminance value corresponding to intensity of the light;
a processor configured to:
perform a selection process, wherein the selection process includes:
dividing each of the first image and the second image into a plurality of regions,
calculating a mean and a standard deviation of the luminance values of each of the plurality of regions
determining that uniform light is incident to a particular corresponding regions of the first image and the second image based on the mean and the standard deviation of the luminance values of each of the plurality of regions of the first image and the second image
selecting either the first imaging element or the second imagining element as a reference source based on the mean and standard deviations in the particular corresponding regions, wherein the reference source has a highest mean luminance value in the particular corresponding regions or a lowest standard deviation in the particular corresponding regions, and
selecting either the first imaging element or the second imagining element as a comparison source based on the mean and standard deviations in the particular corresponding regions, wherein the reference source has either a lowest mean luminance value in the particular corresponding regions or a highest standard deviation value in the particular corresponding regions;
obtain a reference image from the reference source;
obtain a comparison image from the comparison source;
extract a first region from the reference image,
search a second region on the comparison image, where the second region corresponds to the first region,
obtain disparity between the first region and the second region,
obtain a distance image from the disparity, and
recognize an object based on the distance image.

* * * * *